(12) United States Patent
Poshtan et al.

(10) Patent No.: US 11,854,359 B2
(45) Date of Patent: Dec. 26, 2023

(54) USING POWER INFRASTRUCTURES FOR WILDFIRE DETECTION

(71) Applicant: Cal Poly Corporation, San Luis Obispo, CA (US)

(72) Inventors: Majid Poshtan, San Luis Obispo, CA (US); Joseph Callenes-Sloan, Los Osos, CA (US)

(73) Assignee: CAL POLY CORPORATION, San Luis Obispo, CA (US)

( * ) Notice: Subject to any disclaimer, the term of this patent is extended or adjusted under 35 U.S.C. 154(b) by 243 days.

(21) Appl. No.: 17/477,908

(22) Filed: Sep. 17, 2021

(65) Prior Publication Data
US 2022/0084381 A1 Mar. 17, 2022

Related U.S. Application Data

(60) Provisional application No. 63/079,889, filed on Sep. 17, 2020.

(51) Int. Cl.
| | |
|---|---|
| *G08B 17/12* | (2006.01) |
| *G08B 17/00* | (2006.01) |
| *G06N 20/20* | (2019.01) |
| *G01W 1/02* | (2006.01) |
| *G08B 25/06* | (2006.01) |

(52) U.S. Cl.
CPC ............. *G08B 17/005* (2013.01); *G01W 1/02* (2013.01); *G06N 20/20* (2019.01); *G08B 17/12* (2013.01); *G08B 25/06* (2013.01)

(58) Field of Classification Search
CPC ...... G08B 17/005; G08B 17/12; G08B 25/06; G08B 25/014; G08B 17/06; G01W 1/02; G06N 20/20; G01K 3/005

USPC .......................................................... 340/578
See application file for complete search history.

(56) References Cited

U.S. PATENT DOCUMENTS

| | | | |
|---|---|---|---|
| 6,205,867 B1* | 3/2001 | Hayes | H02G 7/02 73/862.391 |
| 2016/0178681 A1* | 6/2016 | Lilien | H02J 13/00002 702/130 |
| 2020/0225273 A1* | 7/2020 | Manson | H02H 1/0023 |

OTHER PUBLICATIONS

"California Energy Commission, cartography unit; U.S. Census Bureau, cal-atlas"; https://cecgis-caenergy.opendata.arcgis.com/datasets/260b4513acdb4a3a8e4d64e69fc84fee_0/data?geometry=-133.637%2C34.336%2C-103.622%2C40.44; accessed Jul. 30, 2019.
Ampacimon; "ADR Sense Self-Powered Vibration Sensor with GSM Data Transmisssion"; www.ampacimon.com; accessed Jul. 30, 2019.

(Continued)

*Primary Examiner* — Tai T Nguyen
(74) *Attorney, Agent, or Firm* — Fitch, Even, Tabin & Flannery, LLP

(57) ABSTRACT

Methods, apparatuses, and systems for wildfire detection using power infrastructure are described. One or more aspects of the techniques described include determining (e.g., quantifying) the impact of wildfires on power structures and transmission line sensors. Determination of measurable changes in transmission line temperature and transmission line sag, that result from early onset fires, are used to detect heat events. Therefore, real-time monitoring of transmission line temperature and transmission line sag (e.g., using sensors that are already deployed in some power grid infrastructures) may efficiently detect the early onset of wildfires according to techniques described herein.

13 Claims, 16 Drawing Sheets

(56) References Cited

OTHER PUBLICATIONS

Aslan et al; "Early Wildfire Smoke Detection Based on Motion-Based Geometric Image Transformation and Deep Convolutional Generative Adversarial Networks"; ICASSP 2019—2019 IEEE International Conference on Acoustics, Speech and Signal Processing; May 2019; pp. 8315-8319.

Cloet et al; "Uprating Transmission Lines through the use of an innovative real-time monitoring system"; IEEE; May 2011; 7 pages.

EPA; "Winners of the Wildland Fire Sensors Challenge Develop Air Monitoring System Prototypes"; awards presented Sep. 12, 2018; https://www.epa.gov/air-research/winners-wildland-fire-sensors-challenge-develop-air-monitoring-system-prototypes; 6 pages.

Fast Company; "Could a network of sensors give first responders more time to control wildfires?"; Nov. 1, 2019; https://www.fastcompany.com/90424260/could-a-network-of-sens; 9 pages.

Firebreak Protection; "Wildfire Detection"; 2003-2008; https://firebreakpro.com/home-wildfire-detection; 5 pages.

Gao et al; "A Study of MODIS Fire Detecting Channel Centered at 3.95-m" IEEE International Symposium on Geoscience and Remote Sensing; Jul. 2006; pp. 1100-1102.

Linberg; "The Overhead Line Sage Dependence on Weather Parameters and Line Current"; UPTEC W11 017; Examensarbete 30 hp; Dec. 2011; 70 pages.

Nasa; EarthData Open Access For Open Science; "FIRMS FAQ"; https://earthdata.nasa.gov/faq/firms-faq#ed-false-detections; downloaded Oct. 13, 2021; 2019; 26 pages.

NIST; "Fire Dynamics"; https://www.nist.gov/el/fire-research-division-73300/firegov-fire-service/fire-dynamics; accessed Jul. 30, 2019; Nov. 17, 2010; 11 pages.

Quayle; USDA Forest Service; "Active Fire Mapping Program"; https://fsapps.nwcg.gov/#; downloaded Oct. 13, 2021; 2017; 2 pages.

Reyes-Velarde; Los Angeles Times; "California's Camp Fire was the costliest global disaster last year, insurance report shows"; https://www.latimes.com/local/lanow/la-me-In-camp-fire-insured-losses-20190111-story.html# . . . ; Jan. 11, 2019; 7 pages.

Saghri et al; "Detection of smoke plume for a land-based early forest fire detection system" SPIE Digital Library; Sep. 2015; 11 pages.

USDA; "California's Forest Resources: Forest Inventory and Analysis, 2001-2010"; Feb. 2016; 3 pages.

Wydra et al; "Power System State Estimation Using Wire Temperature Measurements for Model Accuracy Enhancement" IEEE PES Innovative Smart Grid Technologies Conference Europe; Oct. 2016; pp. 1-6.

\* cited by examiner

USING POWER INFRASTRUCTURES FOR WILDFIRE DETECTION

This application claims the benefit of U.S. Provisional Application No. 63/079,889, filed Sep. 17, 2020, entitled USING POWER INFRASTRUCTURES FOR WILDFIRE DETECTION IN CALIFORNIA, which is incorporated in its entirety herein by reference.

BACKGROUND OF THE INVENTION

1. Field of the Invention

The present invention relates generally to power infrastructure, and more specifically to early detection of wildfires utilizing power grid structures and sensors.

2. Discussion of the Related Art

Various systems and processes are known in the art for wildfire detection.

Fire may refer to a combustion process that releases light, heat, and various reaction products. Often, fire affects various ecological systems (e.g., including humans, wildlife, etc.). In some cases, fire may be classified (e.g., as a rural fire, a forest fire, a wildfire, etc.) based on physical properties of the fire, the combustible material present in the fire, and the cause of ignition, among other examples. For instance, a wildfire may refer to a fire (e.g., an uncontrolled fire) in rural areas (e.g., in an area of combustible vegetation present in rural areas). Wildfire behavior, as well as the severity of a wildfire, may depend on various circumstances such as physical setting, available fuels, and weather.

In some cases, wildfires may cause damage to (or loss of) human life, property, ecological systems, earth resources, etc. For instance, fires (e.g., wildfires) starting or advancing during high winds in dry vegetation may result in rapid growth of the fire (e.g., due to available dry vegetation fuel and wind advancement). The destruction caused by such fires may be extensive. Accordingly, improved techniques for reducing and mitigating fires may be desired

SUMMARY

Several embodiments of the invention advantageously address the needs above as well as other needs by providing an apparatus, system, and method for wildfire detection using power infrastructure.

One or more aspects of a described apparatus, system, and method include a first overhead electric transmission line sag sensor, a computing system, and an alarm output. In some examples, the first overhead electric transmission line sag sensor detects a degree to which a first overhead electric transmission line segment suspended between a first pair of electric transmission towers is sagging and generates a first overhead electric transmission line sag signal indicative of the degree to which the first overhead electric transmission line segment is sagging. In some examples, the computing system comprises a first code segment, a second code segment, and a third code segment: wherein the first code segment is configured to compare the first overhead electric transmission line sag signal with an expected overhead electric transmission line sag; the second code segment is configured to determine an amount of sag deviation between the first overhead electric transmission line sag signal and the expected overhead electric transmission line sag, and determine a value of a sag variation resulting from sub-optimal power flow distinguished from other sources of sag by comparing adjacent sag detectors and pre-trained models; and the third code segment is configured to generate an alarm condition based on at least one determination, wherein the at least one determination includes determining that the amount of sag deviation is more than a prescribed non-zero amount. In some examples, the alarm output is coupled to the computing system and is configured to generate an alarm signal in response to the alarm condition.

One or more aspects of a described method, apparatus, non-transitory computer readable medium, and system include detecting a degree to which a first overhead electric transmission line segment suspended between a first pair of electric transmission towers is sagging; and generating a first overhead electric transmission line sag signal indicative of the degree to which the first overhead electric transmission line segment is sagging. One or more aspects of a described method, apparatus, non-transitory computer readable medium, and system further include comparing the first overhead electric transmission line sag signal with an expected overhead electric transmission line sag; determining an amount of sag deviation between the first overhead electric transmission line sag signal and the expected overhead electric transmission line sag and a value of a sag variation resulting from sub-optimal power flow distinguished from other sources of sag by comparing adjacent sag detectors and pre-trained models; generating an alarm condition based on at least one determination, wherein the at least one determination includes determining that the amount of sag deviation is more than a prescribed non-zero amount; and generating an alarm signal in response to the alarm condition.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
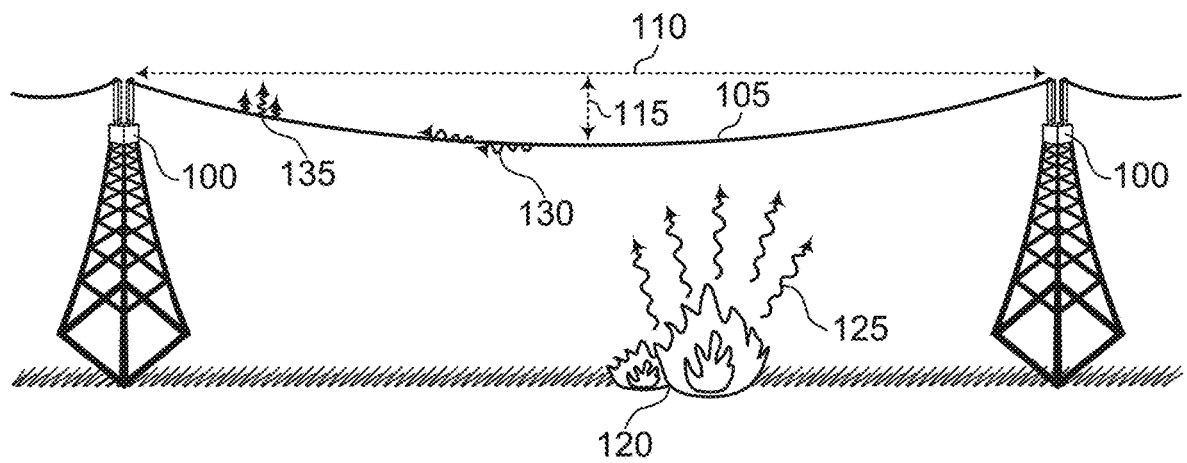
FIGS. 1 through 2 show examples of a power infrastructure system according to aspects of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Large wildfires can cause significant damages to communities and ecosystems. In some cases, wildfires may result in loss of life (e.g., human deaths, animal deaths, ecosystem damages), loss of land or los of resources (e.g., millions of burned or damaged acres), restoration costs, etc.

Many wildfires originate from human causes, however wildfires can also originate from lightning strikes, faulty power grid infrastructure, etc. For instance, some fires may be started by electrical lines or electrical equipment during high wind events. For instance, high wind events may cause electrical equipment or electrical lines to fail (e.g., fall, disconnect, etc.) which may then contact trees, brush, or other vegetation. Such may result in sparks that may catch fuel in the form of the contacted trees, brush, vegetation, etc.

In some cases, power companies may face liabilities when wildfires originate from a downed transmission line. As communities experience greater variability in weather and drought, these issues are likely to worsen.

Detecting remote wildfires at their onset (e.g., before exponential growth) can help significantly in saving lives and resources. Additionally, an important phenomenon in the spread of wildfires is the occurrence of spot fires. As a large fire burns, wind blows embers through the air up to 6 miles ahead of the main fire front. The spread of spot fires is still not well understood, but they are believed to play a significant part in the spread of large fires. Detection of these spot fires is also an important problem.

Since the early 1900s the US Forest service has utilized out-posts to observe remote areas. Conventional wildfire detection approaches may be based on satellite imaging systems. The Moderate Resolution Imaging Spectroradiometer (MODIS) satellite uses infrared (IR) cameras to take images of wide areas (e.g., at a rate of multiple times per hour). With advances in machine learning and computer vision algorithms, these systems have improved their detection radius, but are still limited in their accuracy. For example, there may be delays (e.g., such as a 3-hour satellite detection latency) and limitations in the size of fires that can be detected (e.g., the average size of a fire that satellites can detect is 1000 m2 and, under near-ideal conditions, fires down to 100 m2 may also be detected).

Fixed and Unmanned Aerial Vehicle (UAV)-based infrared cameras and detection algorithms have also been proposed for use in monitoring sites that have particularly high fire risks. Using computer vision, these works have been able to detect fire artifacts, such as smoke plumes (e.g., with true negative rates over 93% and true positive rates from 60-86%). Using fixed red green blue (RGB) cameras, researchers have also shown how smoke plumes from fires as small as 2 m2 can be detected up to 800 meters away and within 21 seconds of image processing. However, this approach requires the additional cost of UAVs, distributed cameras and other equipment.

Given the growing challenge of wildfires and their impacts, new approaches are needed for early wildfire detection. Therefore, a need exists for an efficient approach for the early detection of wildfires utilizing power grid structures and sensors that can detect small fires in short periods of time.

Power grid infrastructures span many remote areas. Additionally, some of these systems may include distributed sensors for measuring transmission line temperatures and sag in order to determine optimal power flows. According to techniques described herein, real-time monitoring of transmission line temperature sensors and transmission line sag sensors (e.g., which may be deployed in power grid infrastructures) may efficiently detect the early onset of wildfires. In some examples, techniques described herein may be implemented using existing sensors in power infrastructures (e.g., such that new or additional devices or costs may not necessarily be required).

One or more aspects of the techniques described herein may include determining (e.g., quantifying) the impact of wildfires on power structures and sensors. Measurable changes in transmission line temperature and transmission line sag, resulting from early onset fires, are also described.

The techniques described herein may provide for earlier fire detection and thus more efficient fire prevention. Techniques and equipment configurations described herein may provide utilities (e.g., power infrastructure companies) more efficient solutions to prevent fires (e.g., and rapid spreading of fires), which may ultimately save lives, property, resources, etc.

FIG. 1 shows an example of a power infrastructure system according to aspects of the present disclosure. The example shown includes transmission line towers 100, overhead electric transmission line segment 105, span distance 110, sag 115, heat event 120, radiative heat 125, conductive heat 130, and convection heat 135.

FIG. 1 may illustrate aspects of an example thermal energy transfer from a heat event 120 (e.g., a fire) in a power infrastructure system. For instance, thermal energy transfer from a heat event 120 to a transmission line (e.g., overhead electric transmission line segment 105) may occur through three primary mechanisms including thermal radiation (e.g., radiative heat 125 on overhead electric transmission line segment), thermal conduction (e.g., conductive heat 130 on overhead electric transmission line segment 105), and thermal convection (e.g., convection heat 135 on overhead electric transmission line segment 105).

In some aspects, the effectiveness of one or more embodiments of the present disclosure may be evaluated and described using heat transfer simulations. For example, the detection latency of the proposed approach may be less than a minute and have a detection coverage of over 120 m from the power infrastructure.

Thermal energy transfer occurs between physical systems through three primary mechanisms, thermal conduction, thermal convection, and thermal radiation. Heat events 120 such as fires emit energy in the form of heat and light (e.g., via an exothermic chemical reaction). The transfer of heat from the heat event 120 results in changes in temperature of surrounding objects (e.g., including overhead electric transmission line segment 105).

Thermal radiative heat 125 transfer occurs by electromagnetic waves and is the fastest of the heat transfer mechanisms as radiation travels at the speed of light. Radiative heat 125 transfer between two surfaces (surface 1 and surface 2) may be represented as:

$$Q_{rad} = \sigma A_1 F_{1 \rightarrow 2}(T_1^4 - T_2^4)$$

Where $\sigma$ is the Stefan-Boltzmann constant, $A_1$ is the area of surface 1, T is the temperature and $F_{1-2}$ is the view factor, which is the proportion of the radiation which leaves surface 1 and hits surface 2.

$$F_{1 \rightarrow 2} = \frac{1}{A_1} \int_{A_1} \int_{A_2} \frac{\cos\theta_1 \cos\theta_2}{\pi s^2} dA_2 dA_1$$

Thermal conduction is the transfer of conductive heat 130 within solids or between contacting solids. Heat transfer via conduction may be represented as:

$$Q_{cond} = \frac{kA\Delta T}{L}$$

Where k is the thermal conductivity constant, which is also material specific, $\Delta T$ is the change in temperature, A is the cross-sectional exposure area in m², and L is the length of the object in meters. The thermal conductivity for Aluminum is 237 W/m K.

Thermal convection is convection heat 135 transfer by the movement of liquids or gasses. Convection heat 135 transfer from convection may be represented as:

$$Q_{conv} = hA\Delta T$$

Where $\Delta T$ is the change in temperature in Kelvin, A is the cross-sectional area of ezposure, and h is the convective heat transfer constant which is specific to the material in units of W/m² K.

Combining the energy of heat transfer from these mechanisms gives the net exchange of energy as follows:

$$Q_{total} = Q_{conductive} + Q_{radiative} + Q_{convective}$$

Given the net heat transfer, the temperature of the object can be found using the following non-linear ordinary differential equation:

$$\frac{dT}{dt} = \frac{Q_{total}}{mC}$$

Where $Q_{total}$ the energy transfer, m is the mass of the object in grams, and C is a constant representing the heat capacity of the specific material (e.g. Aluminum has a heat capacity of 0.9 J/g° C.).

As the overhead electric transmission line segment 105 is heated, the overhead electric transmission line segment 105 also expands and incurs an expansion in the overhead electric transmission line segment 105 length (e.g., which may result in sag 115). The equation for line expansion of overhead electric transmission line segment 105 may be represented as:

$$\Delta L = \alpha L \Delta T$$

Where L is the length of the overhead electric transmission line segment 105, $\Delta T$ is the change temperature, and a is the coefficient of linear expansion (e.g., for Aluminum Conductor Steel Reinforced (ACSR) wire, which may be the material commonly used for transmission lines such as overhead electric transmission line segment 105).

As the overhead electric transmission line segment 105 expands, it also tends to sag, or sink down from the horizontal level between the towers (e.g., resulting in sag 115).

The equation for sag 115, given a Certain transmission line length (L) of overhead electric transmission line segment 105, may be represented as:

$$\text{Sag} = \sqrt{\frac{3 \times \text{Span} \times (L - \text{Span})}{8}}$$

Span (e.g., span distance 110) is the horizontal distance between the transmission line towers 100. Sensors for measuring sag 115 can use techniques such as LIDAR to measure distances or accelerometers to measure the natural frequency of the line, which can then be used to calculate the sag as follows:

$$\text{Sag} = \frac{g}{(32f^2)}$$

Where g is the gravitational constant (9.8 m/s²) and f is the measured frequency of the overhead electric transmission line segment 105.

Power Grid Based Fire Detection

Modern power grids span remote areas that are highly vulnerable to wildfires and also contain sensors, such as temperature sensors and sag sensors, for power monitoring operations. In some implementations, such infrastructure may be leveraged to provide early fire detection and fire dynamic monitoring (e.g., spot fire formation), according to the techniques described herein.

In FIG. 1, a schematic elevation illustrating heat transfer (e.g., transfer of radiative heat 125, conductive heat 130, and convection heat 135) to an overhead electric transmission line segment 105 due to a heat event 120 (e.g., a fire) is shown. For instance, the power infrastructure system of FIG. 1 may include a first transmission line tower 100, a second transmission line tower 100, an overhead electric transmission line segment 105, a span distance 110, a sag distance 115, a heat event 120, radiative heat 125, conductive heat 130, and convection heat 135.

The overhead electric transmission line segment 105 spans over the length of a span distance 110 from a top of the first transmission line tower 100 to a top of the second transmission line tower 100. The overhead electric transmission line segment 105 has a sag distance 115 which is the distance that the overhead electric transmission line segment 105 deviates from a straight line distance between the pair of transmission line towers 100. In some examples, FIG. 1 may illustrate a maximum sag distance 115, however it will be understood that the sag distance 115 varies along the length of the overhead electric transmission line segment 105. The overhead electric transmission line segment 105 may also be referred to as a transmission line.

The heat event 120 may be a wildfire, another type of fire, or may be another type of event producing heat affecting the overhead electric transmission line segment 105.

Radiative heat 125 transfers very quickly from the heat event 120 to the overhead electric transmission line segment 105 and begins to heat the overhead electric transmission line segment 105. At the same time, the heat event 120 heats the surrounding air that eventually also rises and heats the overhead electric transmission line segment. Finally, heat diffuses in the overhead electric transmission line segment 105 itself, via conduction heat 130 that raises the temperature of surrounding transmission line segment 105.

Transmission infrastructures increasingly incorporate sensors for monitoring line temperatures and sag 115 in order to better optimize power flows. Dynamic line rating (or real time thermal line rating) is used to more accurately measure transmission line ampacity (maximum current rating), and better optimize power flows under varying conditions (e.g. weather and wind). By leveraging sag sensors and temperature sensors to monitor real-time conditions of power transmission lines (e.g., such as overhead electric transmission line segment 105), early onset or spot fires can be detected according to techniques described herein.

The thresholds for alarms may depend on system noise and device tolerances. Some temperature sensors have a resolution from 0.1 to 2° C. Sag sensors, using accelerometers to measure the fundamental frequency of the transmission line, may have tolerances <10 centimeters.

Transmission line towers 100 and overhead electric transmission line segments 105 are examples of, or include aspects of, the corresponding element described with reference to FIGS. 2 and 10-14. Span distance 110, sag 115, heat event 120, radiative heat 125, conductive heat 130, and convection heat 135 are examples of, or include aspects of, the corresponding element described with reference to FIGS. 2 and 11.

Figure 2:
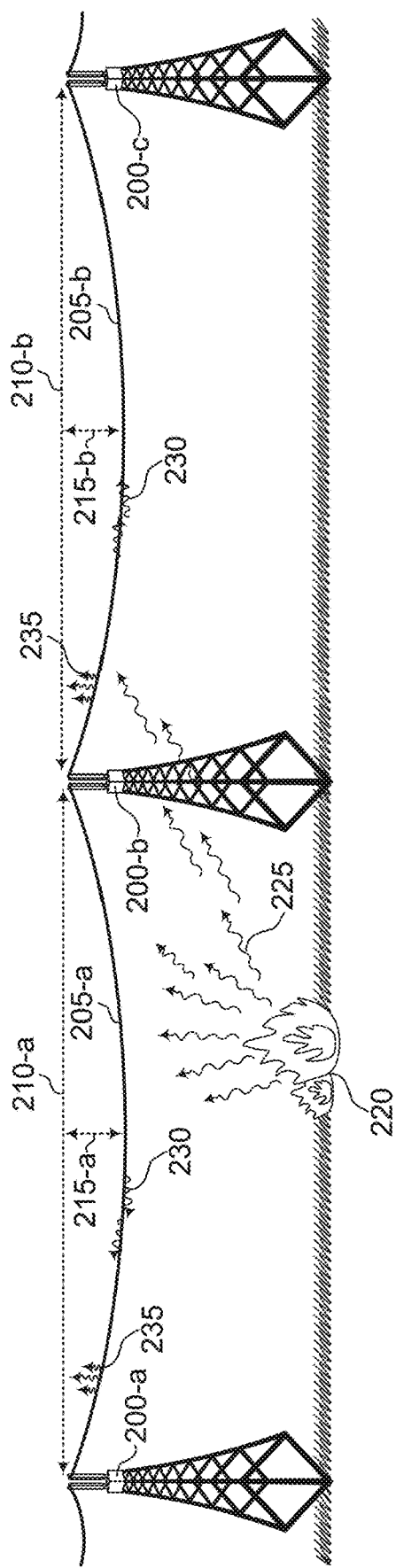

FIG. 2 shows an example of a power infrastructure system according to aspects of the present disclosure. The example shown includes transmission line towers 200, overhead electric transmission line segments 205, span distance 210, sag 215, heat event 220, radiative heat 225, conductive heat 230, and convection heat 235.

In FIG. 2, a schematic elevation illustrating heat transfer to two adjacent overhead electric transmission line segments 205 due to a heat event 220 is shown. Shown are a first electric transmission line tower 200-a, a second electric transmission line tower 200-b, a third electric transmission line tower 200-c, a first overhead electric transmission line segment 205-a, a second overhead electric transmission line segment 205-b, a first span distance 210-a, a second span distance 210-b, a first sag distance 215-a, a second sag distance 215-b, a heat event 220, radiative heat 225, conductive heat 230, and convection heat 235.

As illustrated by FIG. 2, the location of the heat event 220 affects the heat distribution to the overhead electric transmission line segments 205-a and 205-b. The heat event 220 of FIG. 2 is located proximate to the first overhead electric transmission line segment 205-a, between the first transmission line tower 200-a and the second transmission line tower 200-b. As a result, the first overhead electric transmission line segment 205-a will experience a greater degree of heat from the heat event 220 than the second overhead electric transmission line segment 205-b.

In some aspects, a series of heat transfer simulations may model the heat and fire dynamics of the techniques described herein. For instance, a simulation may process each overhead electric transmission line segment 205 (where an overhead electric transmission line segment 205 is defined as a portion of the transmission line spanning between two adjacent electric transmission line towers 200) and determine the heat transfer to that overhead electric transmission line segment 200 based on radiative heat 225 from the heat event 220, conduction heat 230 between adjacent overhead electric transmission line segments 205, convection heat 235 between the air around the overhead electric transmission line segment 205, and convection heat 235 between the heat event 220 and the overhead electric transmission line segment 205 (e.g., in J/s).

Based on the specific heat capacity of the material (ASCR), the change in temperature at fixed time steps (10 s) was determined. Table 1 shows the parameters used for modeling an overhead electric transmission line segment 205 (e.g., top half of Table 1) and simulation/heat event 220 related parameters (e.g., bottom half of Table 1).

TABLE 1

| Model Parameters | | |
|---|---|---|
| Transmission line Parameters | Wire Radius | 0.01905 m |
| | Line Length | 304.8 m |
| | Wire Height | 30.48 m |
| | Line Density | 3 kg/m$^3$ |
| | Coeff. conduction | 237 Wm$^{-1}$ K$^1$ |
| | Coeff linear expansion ($\alpha$) | 19 × 10$^{-6}$ K$^{-1}$ |
| | Stefan-Boltzmann ($\sigma$) | 5.67 × 10$^{-8}$ Wm$^{-2}$ K$^{-4}$ |
| Simulation Parameters | Initial wire temp | 30° C. |
| | Fire temp | 800° C. |
| | Fire area | 50 m$^2$ |
| | Time step | 10 s |
| | Wire Segments | 1000 |

Transmission line towers 200 and overhead electric transmission line segments 205, are examples of, or includes aspects of, the corresponding elements described with reference to FIGS. 1 and 10-14. Span distance 210, sag 215, heat event 220, radiative heat 225, conductive heat 230, and convection heat 235 are examples of, or include aspects of, the corresponding elements described with reference to FIG. 1.

Figure 3:
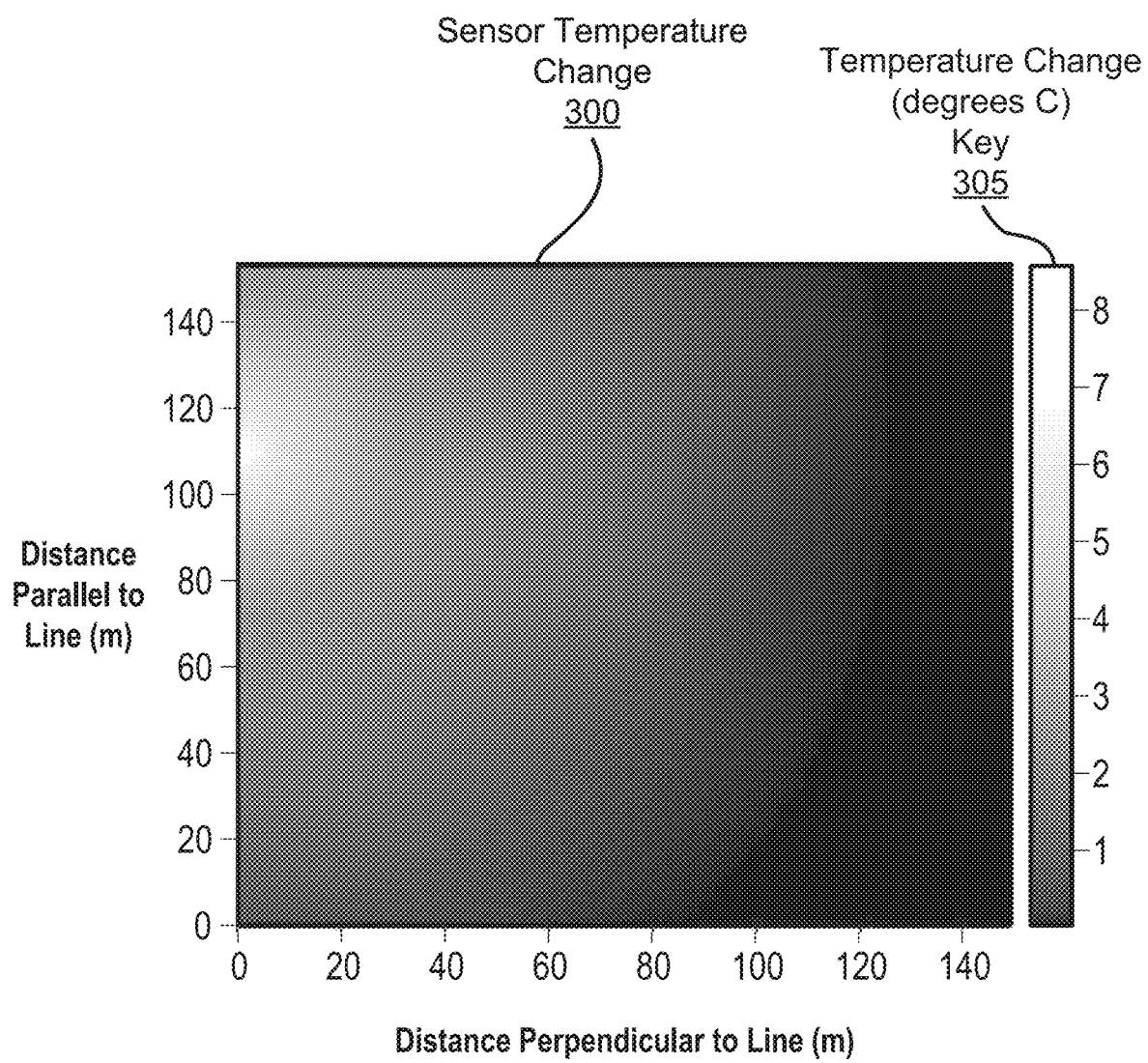
FIGS. 3 through 4 show example coverage map graphs according to aspects of the present disclosure.
Figure 4:
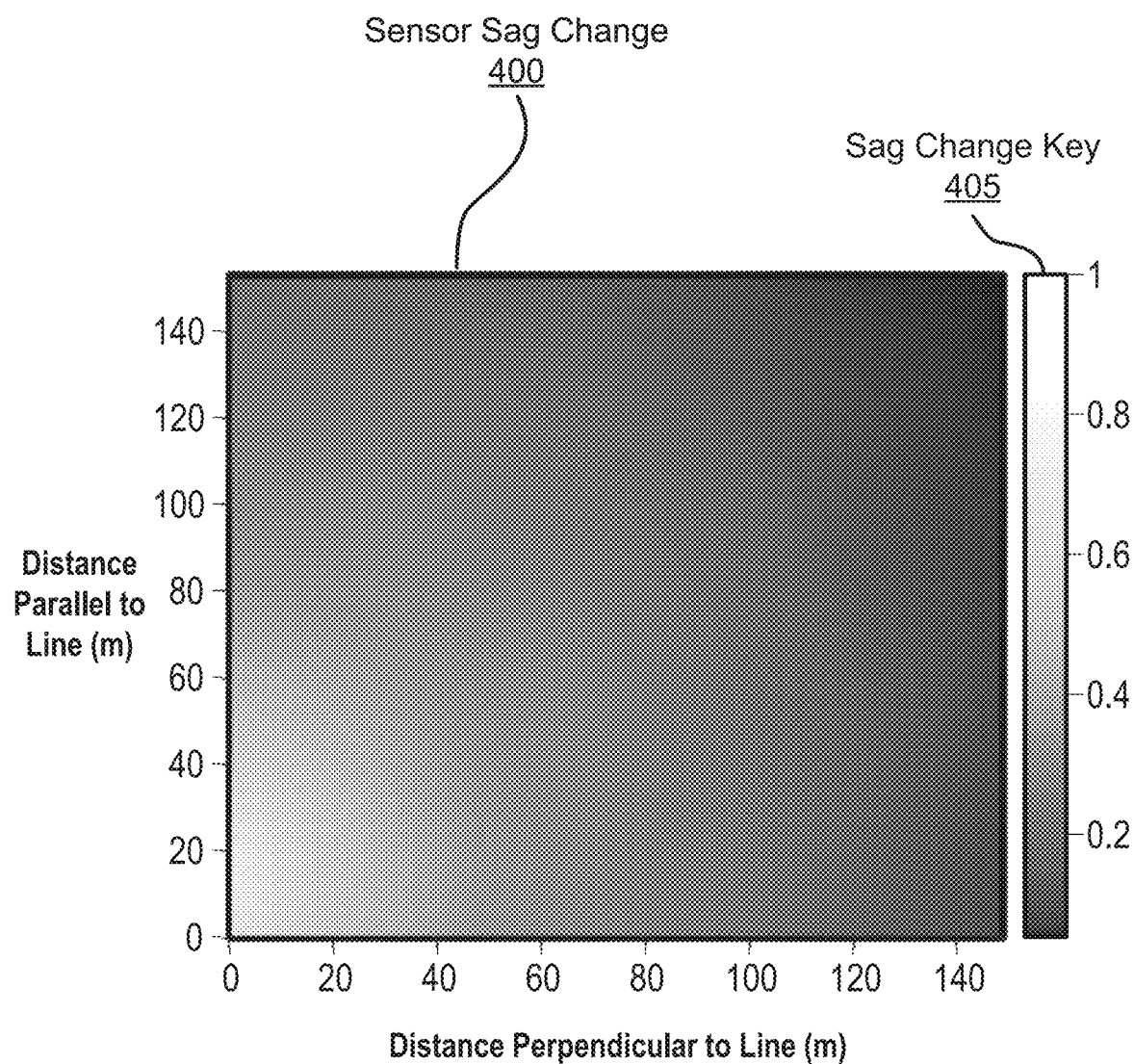

FIG. 3 and FIG. 4 show example coverage map graphs according to aspects of the present disclosure. The example shown in FIG. 3 illustrates sensor temperature change 300 in accordance with temperature change key 305. The example shown in FIG. 4 illustrates sensor sag change 400 according to sag change key 405.

Figure 5:
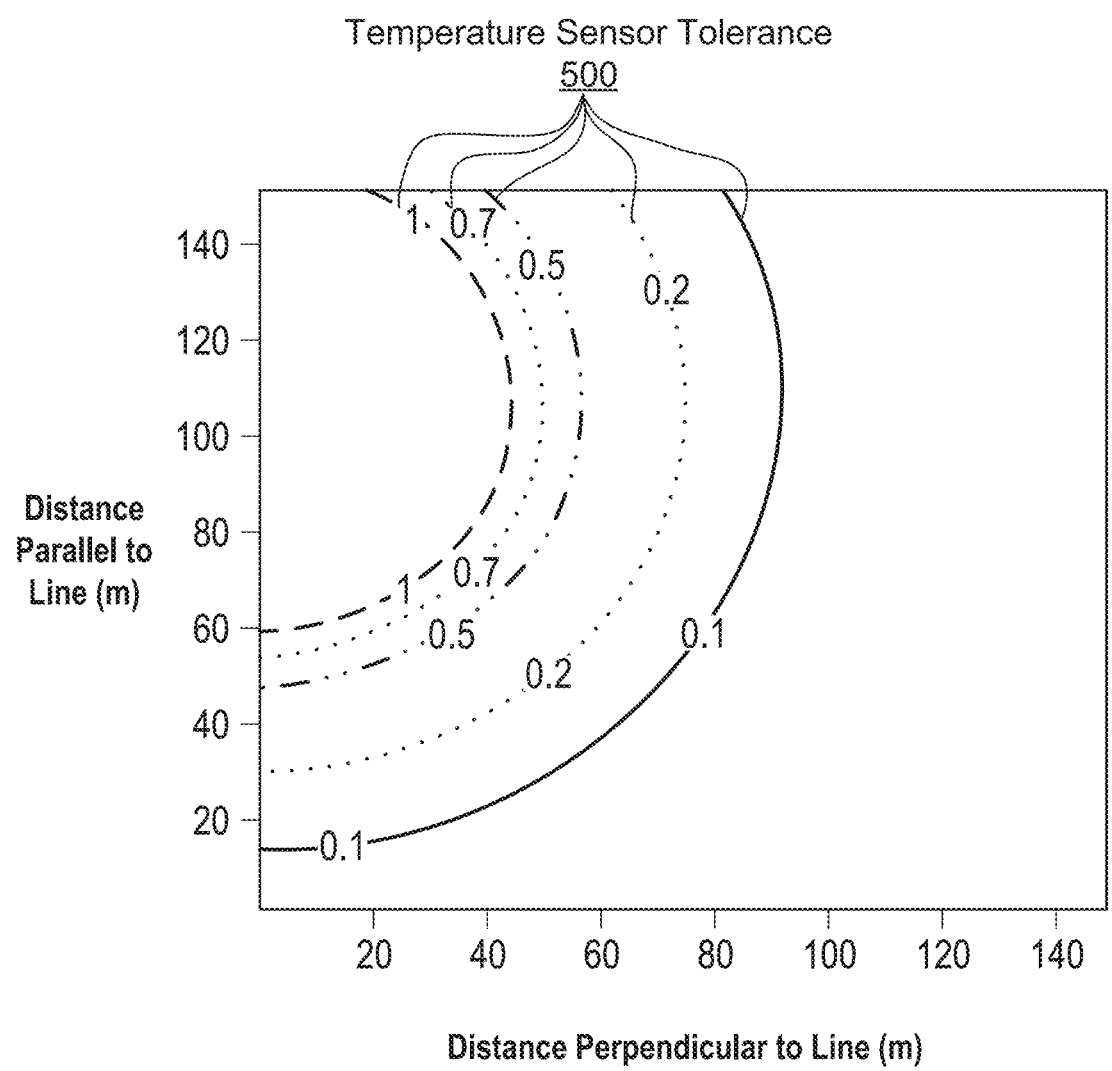
FIG. 5 shows an example of a temperature sensor tolerance graph according to aspects of the present disclosure.
Figure 6:
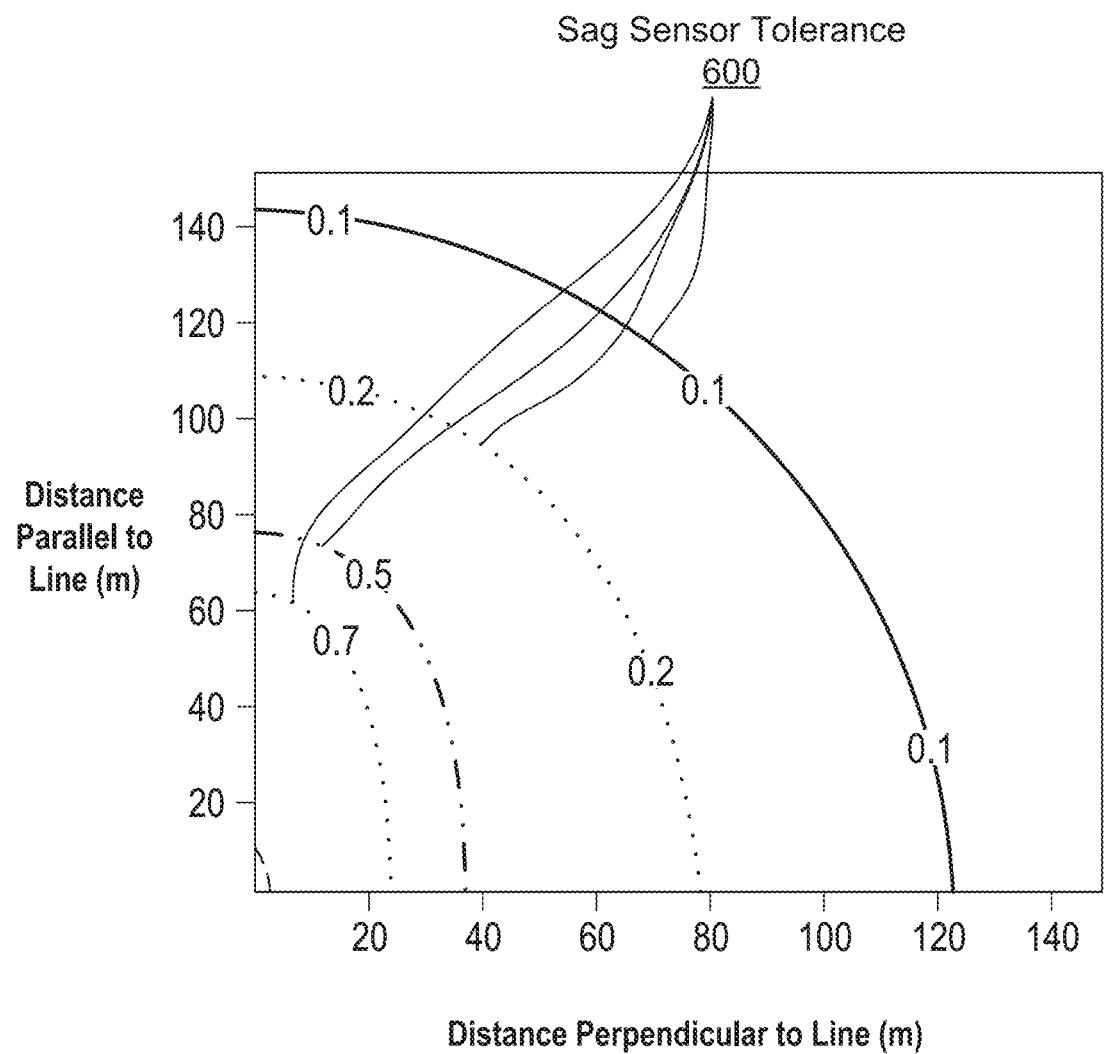
FIG. 6 shows an example of a sag sensor tolerance graph according to aspects of the present disclosure.

FIG. 5 shows an example of a temperature sensor tolerance graph (e.g., illustrating temperature sensor tolerance 500) according to aspects of the present disclosure. FIG. 6 shows an example of a sag sensor tolerance graph (e.g., illustrating sag sensor tolerance 600) according to aspects of the present disclosure.

In FIGS. 3 and 4, the illustrated coverage map graphs show the change in temperature in a transmission line (e.g., an overhead electric transmission line segment) as a heat event (fire) position relative to the transmission line is changed. For instance, these examples may be based on a fixed 50 m² fire over a 10-minute time period, in order to evaluate the impact of the early onset wildfire on the nearby power infrastructure and sensors.

For the graphs in FIGS. 3-6, the transmission line is located along the y-axis (e.g., on the left), and the x-axis (e.g., on the bottom) represents the distance of the heat event (e.g., fire) perpendicularly from the overhead electric transmission line segment. The y-axis represents location of fire as it moves parallel to the overhead electric transmission line segment. The bottom left corner of the graph represents the middle of an exemplary overhead electric transmission line segment (300 m). The temperature/sag sensor (e.g., such as a temperature sensor and/or sag sensor shown coupled to a transmission line as part of a line sensor apparatus in FIGS. 10-13) may be located near the segment end of the transmission line (e.g., top left corner of the graph at 130 m).

FIGS. 3 and 4 show that the heat event (wildfire) results in a significant change in both the temperature and sag measurements. For the temperature measurements shown in FIG. 3, the largest temperature changes are seen when the fire is closer to the actual temperature sensor location (top left corner around 130 m). This confirms, as discussed previously, that radiative heat transfer results in the largest and fastest change in temperature.

Figure 7:
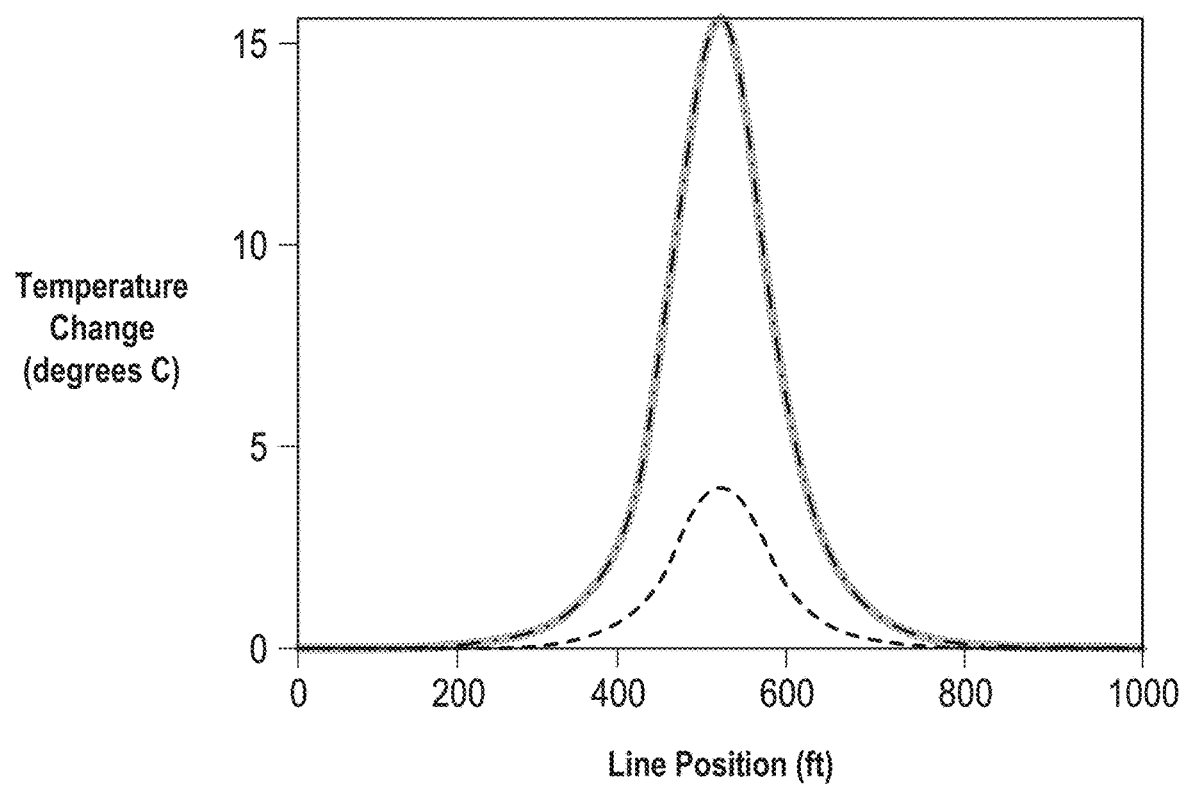
FIG. 7 shows an example of a temperature change graph according to aspects of the present disclosure.

FIG. 7 shows an example of a temperature change graph 700 according to aspects of the present disclosure. For instance, FIG. 7 plots the corresponding temperature change (y-axis) against the position on the line (x-axis) for three combinations of heat transfer: radiative only, radiative+conductive, and radiative+conductive+convective. The radiative line 705 corresponds to temperature change from radiation alone, the radiative+conductive line 710 corresponds to radiation plus conductive heat transfer (i.e. energy diffuses along length of the line), and the radiative+conductive+convective line 715 shows the radiation plus conduction plus convection heat transfer (i.e. heat transferred from fire to air and from wire to air).

FIG. 7 shows that temperature changes from conduction may be negligible, while radiative and convective heat transfers (from wire to air) have the most significant impact on transmission line temperatures. Convective heat transferred from the transmission line to the air resulted in a significant drop in temperature, while the convection from the fire to the air, while also significant, took much longer to rise up and impact the transmission line temperature as compared to the radiative heat transfer.

Referring again to FIGS. 5 and 6, the detection coverage for different detection thresholds (e.g. 1, 0.5, 0.1), for temperature (FIG. 5) and sag (FIG. 6) are shown. Conventional temperature and sag sensors as previously discussed have measurement accuracies as low as 0.1° C. and <0.1 m. Therefore, although the largest temperature and sag changes are seen when the fire is close to the sensor (transmission line), as seen in FIGS. 3 and 4, there are still sufficiently large changes in temperature as the heat event (fire) moves further away from the power infrastructure.

FIGS. 3-6 show that using temperature sensors to detect the heat event may result in a smaller area of coverage. This is largely because, in the middle of the transmission line, the fire may not change the temperature of the area near the temperature sensor enough to raise an alarm. However, sag sensors detect the change in sag in any part of the transmission line, so a sag sensor may more efficiently detect a fire near the middle of the transmission line. Based on this data, the detection coverage may be estimated to be around a 150 m section of transmission line, using the temperature sensors to be approximately 31,000 m², and the coverage using sag sensors to be nearly twice as large, approximately 57,000 m².

As an example, in California, there may be around 35,000 miles of transmission and sub-transmission lines. This translates to roughly 10.5336 billion m² (2.6 million acres) of land that can be monitored for wildfires using the techniques described herein (e.g., which may leverage existing infrastructure, in some aspects). This amounts to covering approximately 7.88% of all California forest area (33 million acres). Using distribution power lines (roughly 150,000 miles), this could result in covering over 30% of forested areas.

Next, detection latency of the techniques described herein is evaluated (e.g., how fast does a small wildfire result in a measurable change in temperature sensor measurements and sag sensor measurements utilized for real-time power operation monitoring).

Figure 8:
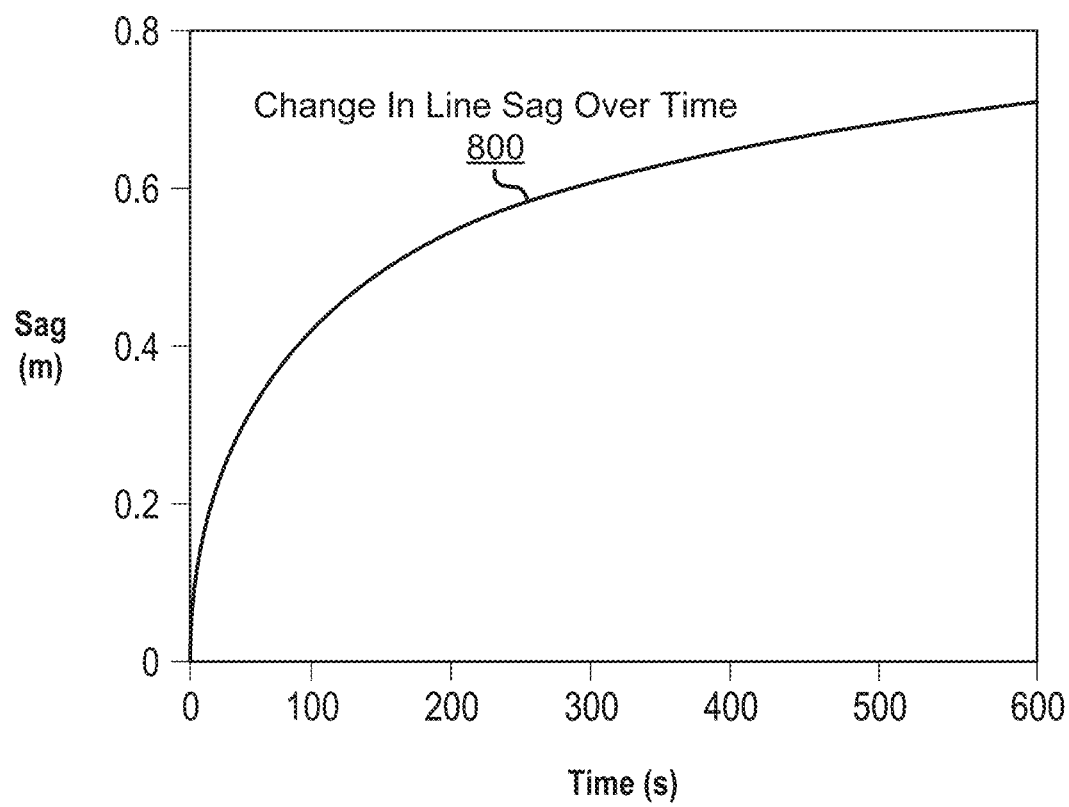
FIG. 8 shows an example of a sag change graph according to aspects of the present disclosure.

FIG. 8 shows an example of a sag change graph according to aspects of the present disclosure. FIG. 8 is a graph showing the change in sag (y-axis) vs the time in seconds (x-axis). After about 20 seconds the transmission line experiences a 10-20 cm increase in sag due to a 50 m² fire. Based on the expected detection accuracy of the sag sensors, one or more aspects of the techniques described herein may be able to detect early onset wildfires within 20-30 seconds (e.g., based on sag sensor measurements).

Figure 9:
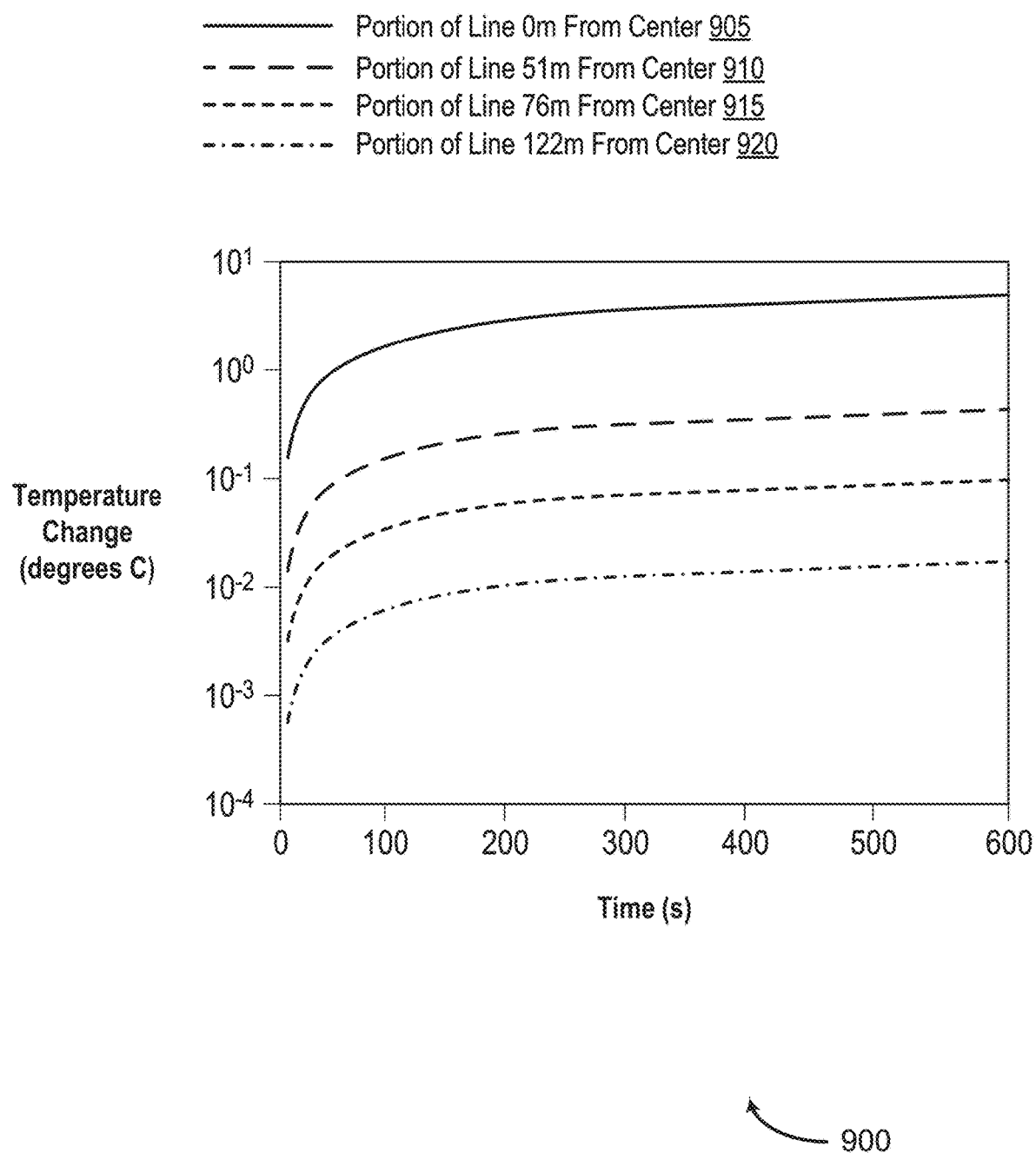
FIG. 9 shows an example of a temperature change graph according to aspects of the present disclosure.

FIG. 9 shows an example of a temperature change graph 900 according to aspects of the present disclosure. FIG. 9 is a graph showing the change in temperature (y-axis) vs the time in seconds (x-axis), and each line in the graph corresponds to a different distance, in meters, from the center of the line, where the fire is located. Lines for the portion of the line 0 m from center (e.g., plot line 905), 51 m from center (e.g., plot line 910), 76 m from center (e.g., plot line 915), and 122 m from center are shown (e.g., plot line 920).

As energy dissipates from the transmission line via convection to the air, the temperature rises at a slower rate. Based on a detection threshold of about 0.5° C., as discussed previously, the presence of the fire may be detected within, for example, 100 seconds.

The models indicate that both temperature sensors and sag sensors can be leveraged for improved accuracy. As can be seen from the coverage maps in FIGS. 3 and 4, the temperature sensor may efficiently detect heat events when the heat event is near the sensor (near the end of the transmission line segment), while the sag sensor may more efficiently detect a heat event when the fire is located toward the middle of the transmission line.

In some examples, such an approach may assume that the transmission line's view of (e.g., or exposure to) the heat event is not obstructed (e.g. by foliage), which may otherwise prevent the fire's radiation from reaching the transmission line, in some examples.

Figure 10:
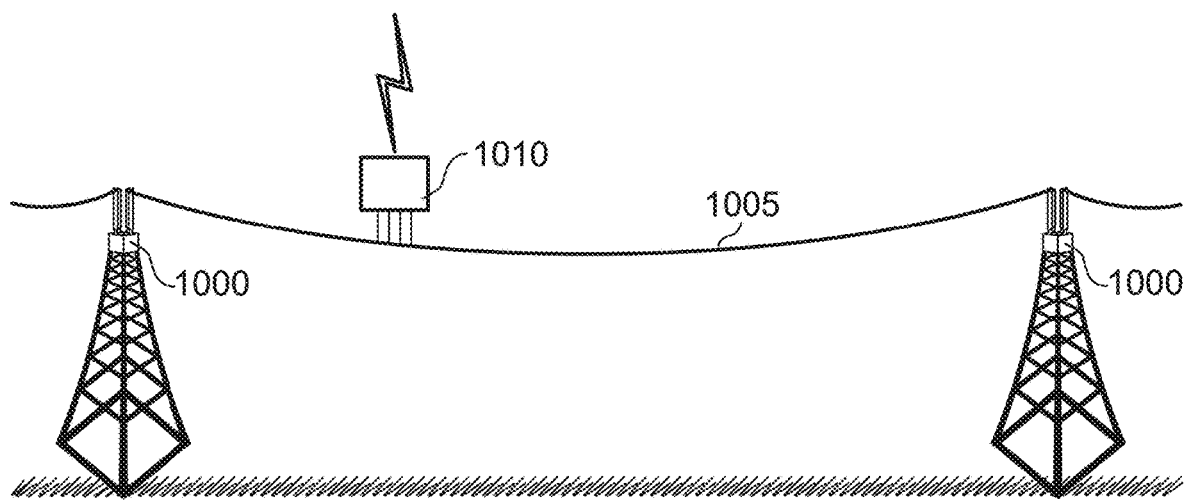
FIG. 10 shows an example of a power infrastructure system according to aspects of the present disclosure.

FIG. 10 shows an example of a power infrastructure system according to aspects of the present disclosure. The example shown includes transmission line towers 1000, overhead electric transmission line segment 1005, and line sensor apparatus 1010.

Figure 12:
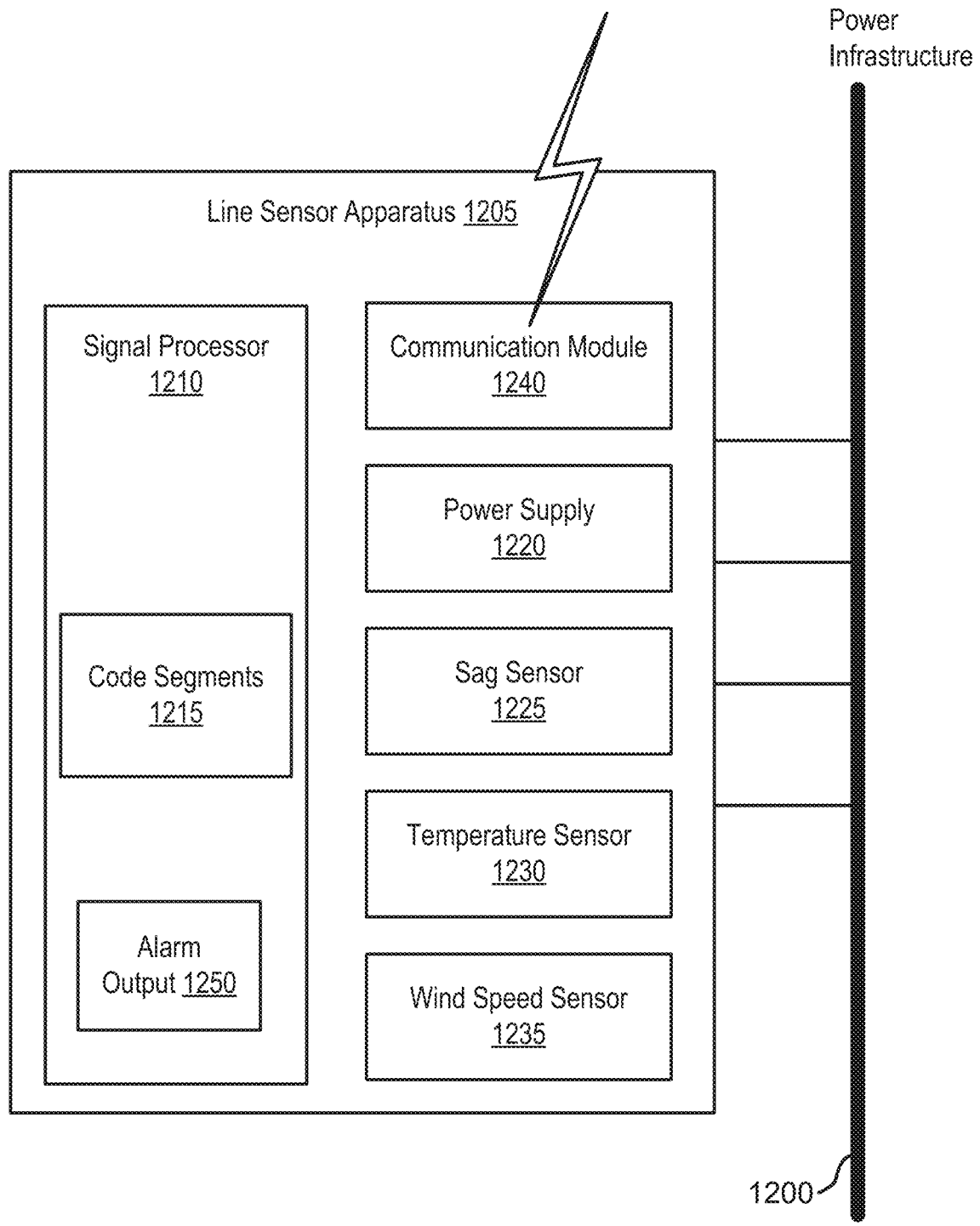
Figure 13:
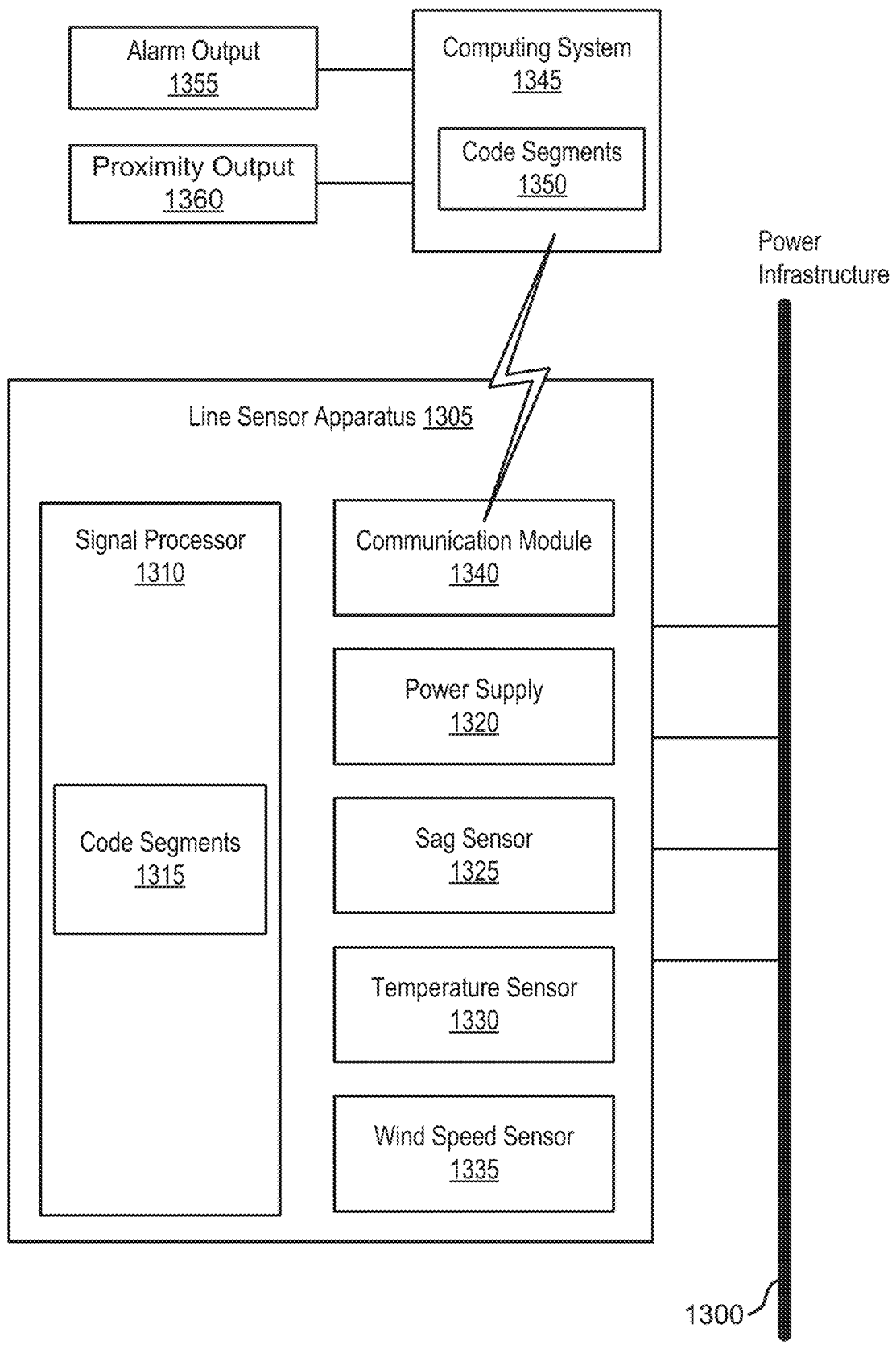

In some aspects, the line sensor apparatus 1010 may be the line sensor apparatus 1010 as shown in FIG. 12 or 13, or may be another line sensor apparatus 1010 configured to carry out the functions described herein.

In some embodiments the line sensor apparatus 1010 contains only a single sensor.

The line sensor apparatus 1010 may be located a distance from each transmission line tower 1000. The distance shown in FIG. 10 is exemplary, and the line sensor apparatus 1010 may be located at any suitable location along the overhead electric transmission line segment 1005.

The line sensor apparatus 1010 may be coupled to the overhead electric transmission line segment 1005 by any suitable means.

A single line sensor apparatus 1010 is shown for clarity, but it will be understood that multiple line sensor apparatuses may be coupled to the same overhead electric transmission line segment 1005.

Transmission line towers 1000 and overhead electric transmission line segments 1005 are examples of, or include aspects of, the corresponding elements described with reference to FIGS. 1, 2, and 11. Line sensor apparatus 1010 is an example of, or includes aspects of, the corresponding element described with reference to FIGS. 11-13.

Figure 11:
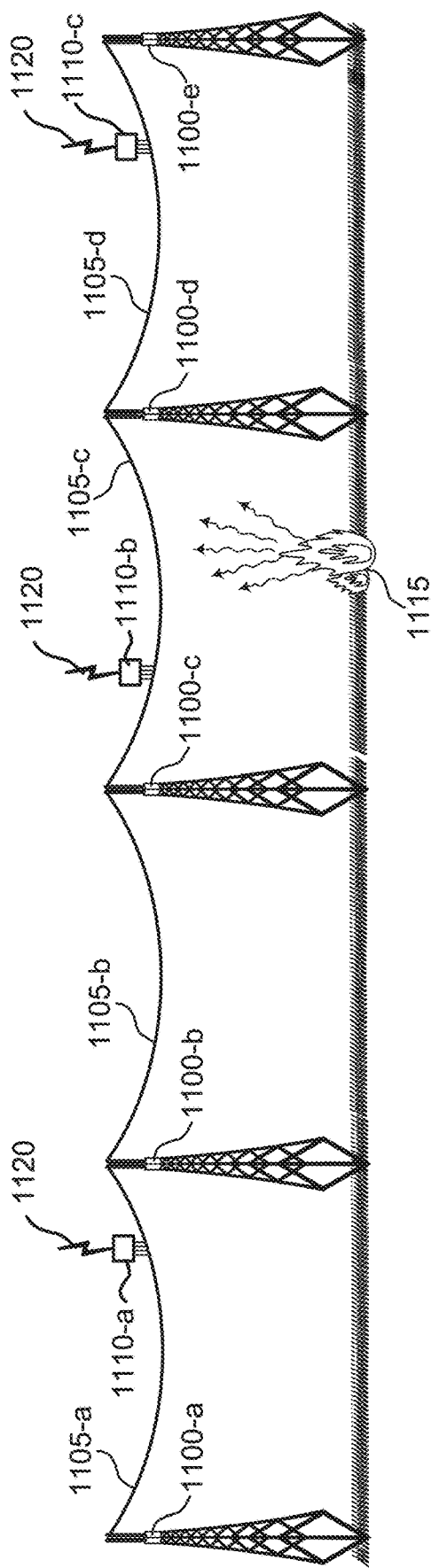
FIGS. 11 through 13 show examples of a system for detecting radiated heat events according to aspects of the present disclosure.

FIG. 11 shows an example of a system for detecting radiated heat events 1115 according to aspects of the present disclosure. For instance, in FIG. 11, a schematic elevation of a plurality of overhead electric transmission line segments 1105 with a plurality of line sensor apparatuses 1110 is shown. Shown are a first electric transmission line tower 1100-a, a second electric transmission line tower 1100-b, a third electric transmission line tower 1100-c, a fourth electric transmission line tower 1100-d, a fifth electric transmission line tower 1100-e, a first overhead electric transmission line segment 1105-a, a second overhead electric transmission line segment 1105-b, a third overhead electric transmission line segment 1105-c, a fourth overhead electric transmission line segment 1105-d, a first line sensor apparatus 1110-a, a second line sensor apparatus 1110-b, a third line sensor apparatus 1110-c, a heat event 1115, and a plurality of communication links 1120.

The elevation shown is schematic and not intended to indicate a specific number of transmission line towers 1100, overhead electric transmission line segments 1105, or line sensor apparatuses 1110. More than two overhead electric transmission line segments 1105 may be connected to any one transmission line tower.

As shown in FIG. 11, a plurality of line sensor apparatuses 1110 are used to obtain sensor measurements at different locations relative to the heat event 1115. By receiving the data from the plurality of line sensor apparatuses 1110 and analyzing the data according to the models and methods described herein, the heat event 1115 can be quickly detected and the location of the heat event 1115 can be identified. In some embodiments the plurality of line sensor apparatuses 1110 from which data is collected and analyzed is part of a heat event 1115 detection network.

Transmission line towers 1100, overhead electric transmission line segments 1105, and heat event 1115 are examples of, or include aspects of, the corresponding elements described with reference to FIGS. 1 and 2.

FIG. 12 shows an example of a system for detecting radiated heat events according to aspects of the present disclosure. The example shown includes overhead electric transmission line segment 1200, line sensor apparatus 1205, and alarm output 1250.

In FIG. 12, a schematic diagram of the exemplary line sensor apparatus 1205 is shown. Shown are a signal processor 1210, a plurality of code segments 1215 (e.g., which may include first through fifth code segments, in addition to other possible code segments), a communication module 1240, a power supply 1220, a first overhead electric transmission line sag sensor 1225, a line temperature sensor 1230, a wind speed sensor 1235, first overhead electric transmission line segment 1200 belonging to a power infrastructure, communication module 1240 and alarm output 1250.

The temperature sensor 1230 measures the air temperature and the transmission line temperature at the location of the temperature sensor 1230. The temperature sensor data is then used in combination with the sag sensor data to create an ensemble model with improved accuracy.

In some embodiments, the wind speed sensor 1235 is used to record at least wind speed and direction. The cooling effect of the wind reduces the sag in normal weather conditions, but increases the sag during a heat event/wildfire because wind expands fire. A derivative of the temperature data with respect to the wind speed data is positive during normal weather. However, during a fire incident, a derivative of the temperature data with respect to the wind speed data is negative. The fire generates winds of its own many times faster than ambient wind nearby the first overhead electric transmission line sag sensor 1225.

The signal processor 1210 receives sensor readings from the included sensors, and runs code segments 1215 for analysis of the sensor readings. The line sensor apparatus 1205 may receive data and/or signals from other line sensor apparatuses via the communication module 1240. In response to running the code segments 1215, the signal processor 1210 activates the alarm output 1250 if an alarm condition is determined.

The rate of change in sag in time domain and space domain are also computed. The rate of change in sag in time domain and space domain are indication factors for uneven increasing heat radiation source. The indicators are measured and compared by the numerical results from mathematical derivatives of temperature versus time and distance for normal weather condition and normal electric heat in the wire. The mathematical derivatives of any change in the sag in time domain and space domain have different results at the presents of intensive uneven heat from the fire. In the event of an alarm, unlike prior art, the system will also provide real-time data on heating dynamics and environmental conditions, and automatically communicate with all necessary parties.

First overhead electric transmission line segment 1200 is an example of, or includes aspects of, the corresponding element described with reference to FIG. 13. Line sensor apparatus 1205 is an example of, or includes aspects of, the corresponding element described with reference to FIGS. 10 and 13. In one aspect, line sensor apparatus 1205 includes signal processor 1210, power supply 1220, first overhead electric transmission line sag sensor 1225, temperature sensor 1230, wind speed sensor 1235, and communication module 1240. Signal processor 1210 is an example of, or includes aspects of, the corresponding element described with reference to FIG. 13. In one aspect, signal processor 1210 includes code segments 1215. Code segments 1215 may be examples of, or include aspects of, the corresponding elements described with reference to FIG. 13. Power supply 1220 is an example of, or includes aspects of, the corresponding element described with reference to FIG. 13.

According to some aspects, first overhead electric transmission line sag sensor 1225 detects a degree to which a first overhead electric transmission line segment suspended between a first pair of electric transmission towers is sagging. In some examples, first overhead electric transmission line sag sensor 1225 generates a first overhead electric transmission line sag signal indicative of the degree to which the first overhead electric transmission line segment is sagging. In some examples, first overhead electric transmission line sag sensor 1225 determines a rate of change in the sag signal in a time domain and a space domain.

According to some aspects, temperature sensor 1230 detects, prior to generating the alarm condition, a temperature proximate to one of the first pair of electric transmission line towers. In some examples, temperature sensor 1230 generates a temperature signal indicative of the temperature proximate to the one of the first pair of electric transmission line towers.

According to some aspects, wind speed sensor 1235 detects a wind speed proximate to one of the first pair of electric transmission line towers and generating a wind speed signal indicative of the wind speed proximate to the one of the first pair of electric transmission line towers, where the generating of the alarm condition further includes determining that a derivative of the temperature signal with respect to the wind speed signal is positive.

Communication module 1240 is an example of, or includes aspects of, the corresponding element described with reference to FIG. 13.

According to some aspects, signal processor 1210 compares the first overhead electric transmission line sag signal with an expected overhead electric transmission line sag. In some examples, signal processor 1210 determines an amount of sag deviation between the first overhead electric transmission line sag signal and the expected overhead electric transmission line sag and a value of a sag variation resulting from sub-optimal power flow distinguished from other sources of sag by comparing adjacent sag detectors and pre-trained models. In some examples, signal processor 1210 generates an alarm condition based on at least one determination, where the at least one determination includes determining that the amount of sag deviation is more than a prescribed non-zero amount.

In some examples, signal processor 1210 compares the first overhead electric transmission line sag signal with a second overhead electric transmission line sag signal. In some examples, signal processor 1210 determines whether the first overhead electric transmission line segment or the second overhead electric transmission line segment is closer to a heat source in response to comparing the first overhead electric transmission line sag signal with the second overhead electric transmission line sag signal. In some examples, signal processor 1210 compares, prior to generating the alarm condition, the temperature signal with an expected temperature. In some aspects, the at least one determination further includes determining that the temperature signal deviates more than a prescribed non-zero amount from the expected temperature.

In some examples, signal processor 1210 compares a mathematical derivative of the rate of change in the sag signal to a prescribed mathematical model for normal weather and normal heating of the first overhead electric transmission line segment, where the generating of the alarm condition further includes determining that the comparison indicates a deviation of the mathematical derivative of the rate of change in the sag signal a difference of more than a prescribed non-zero amount.

According to some aspects, alarm output 1250 generates an alarm signal in response to the alarm condition. In some aspects, the generating of the alarm condition further includes ensemble learning utilizing both a degree to which the first overhead electric transmission line sag signal deviates from the expected overhead electric transmission line sag, and a degree to which the temperature signal deviates from the expected temperature.

In some examples, power supply 1220 may include a wired connection to a power source. In some examples, power supply 1220 may include a battery. A battery is a device that stores and discharges energy through the controlled conversion of chemical energy to electric energy. Energy is stored by preventing the flow of electrons between chemical reactants with different electric potential. Energy is released when electrons are allowed to flow between a positive terminal (cathode) and a negative terminal (anode). When the terminals are connected, the compounds undergo chemical reactions that are known as oxidation and reduction. The chemical reactions may cause a flow of electrolytes and drive current through a circuit. Batteries may be classified by the type of electrochemical cells that contain the chemical reactants. Cell types include galvanic cells, electrolytic cells, fuel cells, flow cells, saltwater cells, molten salt cells, and voltaic piles. These cells may use a liquid electrolyte (wet cell) or a low-moisture paste (dry cell). A battery may be either single-use (primary) and rechargeable (secondary). The chemical reactions of a primary battery may be irreversible, and the battery may stop producing current once it has exhausted the supply of chemical reactants. The chemical reactions of a secondary battery may be reversed by applying a voltage in the opposite direction thereby replenishing the supply of chemical reactants.

In some examples, communication module 1240 may include a transceiver. A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets to for transmission, and to demodulate received packets. In some examples, transceiver may be tuned to operate at specified frequencies. For example, a modem can configure the transceiver to operate at a specified frequency and power level based on the communication protocol used by the modem.

In some aspects, a line sensor apparatus (e.g., a line sensor apparatus 1205 of FIG. 12, a line sensor apparatus 1305 of FIG. 13, etc.) may include a processor, memory, etc. to perform one or more aspects of the functions and techniques described herein.

A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In some aspects, a line sensor apparatus (e.g., as described with reference to FIGS. 10-13) may communicate with a cloud and/or server for a heat event detection system to perform one or more aspects of the functions and techniques described herein.

A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

FIG. 13 shows an example of a system for detecting radiated heat events according to aspects of the present disclosure. The example shown includes first overhead electric transmission line segment 1300, line sensor apparatus 1305, computing system 1345, alarm output 1355, and proximity output 1360.

In FIG. 13, a schematic diagram of the exemplary line sensor apparatus 1305 is shown in another embodiment of the present invention. Shown are a signal processor 1310, a plurality of signal processor code segments 1315, a plurality of computing system code segments 1350, a communication module 1340, a power supply 1320, a first overhead electric transmission line sag sensor 1325, a line temperature sensor 1330, a wind speed sensor 1335, the first overhead electric transmission line segment 1300 as part of a power infrastructure, the computing system 1345, and the alarm output 1355.

The temperature sensor 1330 and the first overhead electric transmission line sag sensor 1325 may be as described herein. The wind speed sensor 1335 is configured to record at least wind speed and direction. The signal processor 1310 may receive some or all of the sensor readings and run some or all of the code segments 1350 for analysis of the sensor readings (e.g., the sensor readings from the temperature sensor 1330 and/or the first overhead electric transmission line sag sensor 1325). In the embodiment shown, data and/or signals resulting from the code segments 1315 are sent to the central computing system 1345, which runs additional code segments 1350 and activates the alarm output 1355 if an alarm condition is determined.

It will be understood that for the system of the plurality of sensors utilized in the heat event detection network, the computing system 1345 will receive data and/or signals from a plurality of the line sensor apparatuses (e.g., including the line sensor apparatus 1305). In some embodiments, the computing system 1345 receives data and/or signals from all of the line sensor apparatuses of the heat event detection network.

An overhead electric transmission line segment 1300 (e.g., first overhead electric transmission line segment) is an example of, or includes aspects of, the corresponding element described with reference to FIGS. 1, 2, and 10-12. Line sensor apparatus 1305 is an example of, or includes aspects of, the corresponding element described with reference to FIGS. 10, 11, and 12.

In one aspect, line sensor apparatus 1305 includes signal processor 1310, power supply 1320, first overhead electric transmission line sag sensor 1325, temperature sensor 1330, wind speed sensor 1335, and communication module 1340. Signal processor 1310 is an example of, or includes aspects of, the corresponding element described with reference to FIG. 12. In one aspect, signal processor 1310 includes code segments 1315 (e.g., which may include first through fifth code segments). Code segments 1315 are examples of, or include aspects of, the corresponding elements described with reference to FIG. 12. Power supply 1320 is an example of, or includes aspects of, the corresponding element described with reference to FIG. 12.

According to some aspects, line sensor apparatus 1305 comprises a first overhead electric transmission line sag sensor 1325, where the first overhead electric transmission line sag sensor 1325 detects a degree to which a first overhead electric transmission line segment 1300 suspended between a first pair of electric transmission towers is sagging and generates a first overhead electric transmission line sag signal indicative of the degree to which the first overhead electric transmission line segment is sagging.

According to some aspects, the temperature sensor 1330 detects a temperature proximate to one of the first pair of electric transmission line towers and generates a temperature signal indicative of the temperature proximate to the one of the first pair of electric transmission line towers.

According to some aspects, the wind speed sensor 1335 detects a wind speed proximate to one of the first pair of electric transmission line towers and generates a wind speed signal indicative of the wind speed proximate to the one of the first pair of electric transmission line towers.

Communication module 1340 is an example of, or includes aspects of, the corresponding element described with reference to FIG. 12.

According to some aspects, computing system 1345 compares the first overhead electric transmission line sag signal with an expected overhead electric transmission line sag. In some examples, computing system 1345 determines an amount of sag deviation between the first overhead electric transmission line sag signal and the expected overhead electric transmission line sag and a value of a sag variation resulting from sub-optimal power flow distinguished from other sources of sag by comparing adjacent sag detectors and pre-trained models. In some examples, computing system 1345 generates an alarm condition based on at least one determination, where the at least one determination includes determining that the amount of sag deviation is more than a prescribed non-zero amount.

In some examples, computing system 1345 compares the first overhead electric transmission line sag signal with a second overhead electric transmission line sag signal. In some examples, computing system 1345 determines whether the first overhead electric transmission line segment or the second overhead electric transmission line segment is closer to a heat source in response to comparing the first overhead electric transmission line sag signal with the second overhead electric transmission line sag signal. In some examples, computing system 1345 compares, prior to generating the alarm condition, the temperature signal with an expected temperature. In some aspects, the at least one determination further includes determining that the temperature signal deviates more than a prescribed non-zero amount from the expected temperature.

In some examples, computing system 1345 compares a mathematical derivative of the rate of change in the sag signal to a prescribed mathematical model for normal weather and normal heating of the first overhead electric transmission line segment, where the generating of the alarm condition further includes determining that the comparison indicates a deviation of the mathematical derivative of the rate of change in the sag signal a difference of more than a prescribed non-zero amount.

According to some aspects, computing system 1345 comprises code segments 1350 including a first code segment, a second code segment, and a third code segment: where the first code segment is configured to compare the first overhead electric transmission line sag signal with an expected overhead electric transmission line sag; the second code segment is configured to determine an amount of sag deviation between the first overhead electric transmission line sag signal and the expected overhead electric transmission line sag, and determine a value of a sag variation resulting from sub-optimal power flow distinguished from other sources of sag by comparing adjacent sag detectors and pre-trained models; and the third code segment is configured to generate an alarm condition based on at least one determination, wherein the at least one determination includes determining that the amount of sag deviation is more than a prescribed non-zero amount.

According to some aspects, a second overhead electric transmission line sag sensor detects a degree to which a second overhead electric transmission line segment suspended between a second pair of electric transmission towers is sagging and generates a second overhead electric transmission line sag signal indicative of the degree to which the second overhead electric transmission line segment is sagging.

In some aspects, the computing system 1345 further includes code segments 1350 including a fourth code segment and a fifth code segment: where the fourth code segment is configured to compare the first overhead electric transmission line sag signal with a second overhead electric transmission line sag signal; and the fifth code segment is configured to determine whether the first overhead electric transmission line segment or the second overhead electric transmission line segment is closer to a heat source in response to the fourth code segment comparing the first overhead electric transmission line sag signal with a second overhead electric transmission line sag signal.

In some aspects, the computing system further includes code segments 1350 including a fourth code segment and a fifth code segment: where the fourth code segment is configured to compare the temperature signal with an expected temperature; and the fifth code segment is configured to determine whether the temperature signal deviates from the expected temperature, where the generating of the alarm condition based on at least one determination further includes determining that the temperature signal deviates more than a prescribed non-zero amount from the expected temperature.

In some aspects, the third code segment further includes ensemble learning utilizing both a degree to which the first overhead electric transmission line sag signal deviates from the expected overhead electric transmission line sag, and a degree to which the temperature signal deviates from the expected temperature. In some aspects, the third code segment is further configured to determine a rate of change in the sag signal in a time domain and a space domain, and to compare a mathematical derivative of the rate of change in the sag signal to a prescribed mathematical model for normal weather and normal heating of the first overhead electric transmission line segment, where the generating of the alarm condition based on at least one determination further includes determining that the comparison indicates a deviation of the mathematical derivative of the rate of change in the sag signal a difference of more than a prescribed non-zero amount.

According to some aspects, alarm output 1355 is coupled to the computing system 1345 configured to generate an alarm signal in response to the alarm condition. In some aspects, the generating of the alarm condition based on at least one determination further includes determining that a derivative of the temperature signal with respect to the wind speed signal is positive.

According to some aspects, proximity output 1360 is coupled to the computing system 1345 and configured to generate a proximity signal in response to the determining of whether the first overhead electric transmission line segment or the second overhead electric transmission line segment is closer to the heat source.

Figure 14:
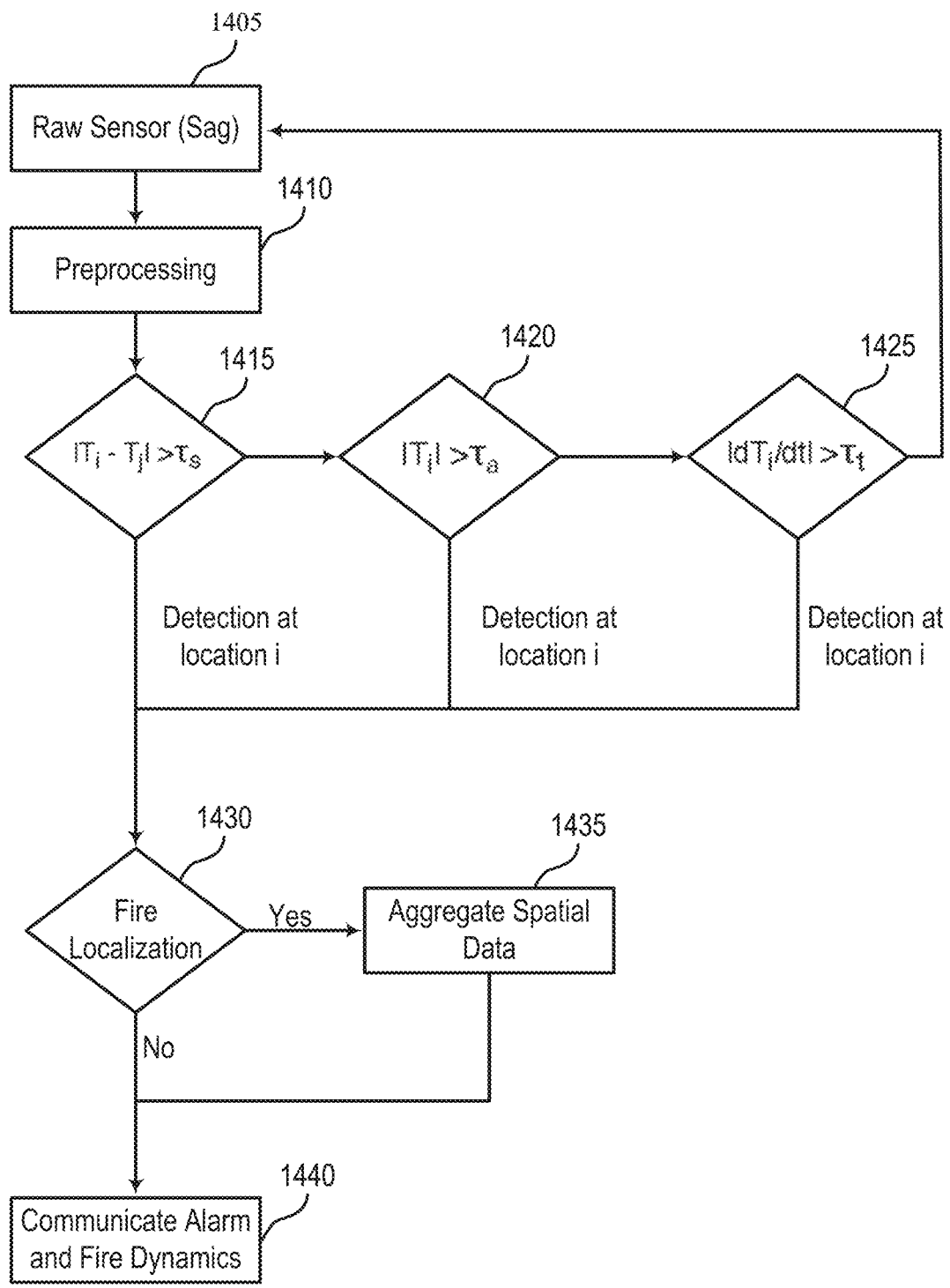
FIG. 14 shows an example of a heat event detection flowchart according to aspects of the present disclosure.

FIG. 14 shows an example of a heat event detection flowchart according to aspects of the present disclosure.

In step 1405, raw sag sensor data is received from a plurality of sag sensors at a plurality of locations on transmission line segments.

In step 1410, preprocessing of the raw sag sensor data takes place.

In step 1415, sag sensor data $T_j$ from a second location j is subtracted from sag sensor data $T_i$ from a first location and the absolute value is compared to a previously determined expected difference in sag $\tau_s$ to determine if the absolute value of the difference is greater than $\tau_s$.

In step 1420, the absolute value of first location sag sensor data is compared to an expected value of sag at location i ($\tau_a$) to determine if the absolute value of $T_i$ is greater than $\tau_a$.

In step 1425, an absolute value of the derivative of the sag at location i ($T_i$) over time (t) is compared to an expected rate of change in the measured sag at location i ($\tau_r$) over time to determine if the absolute value of the derivative is greater than the In step 1430, the comparisons of steps 1415, 1420, and 1425 are input to the fire localization step.

If the fire localization is positive, then spatial data is aggregated, and the process then proceeds to step 1440.

If the fire localization is not positive, then the process proceeds directly to step 1440.

In step 1440, the alarm and fire dynamics are communicated.

Figure 15:
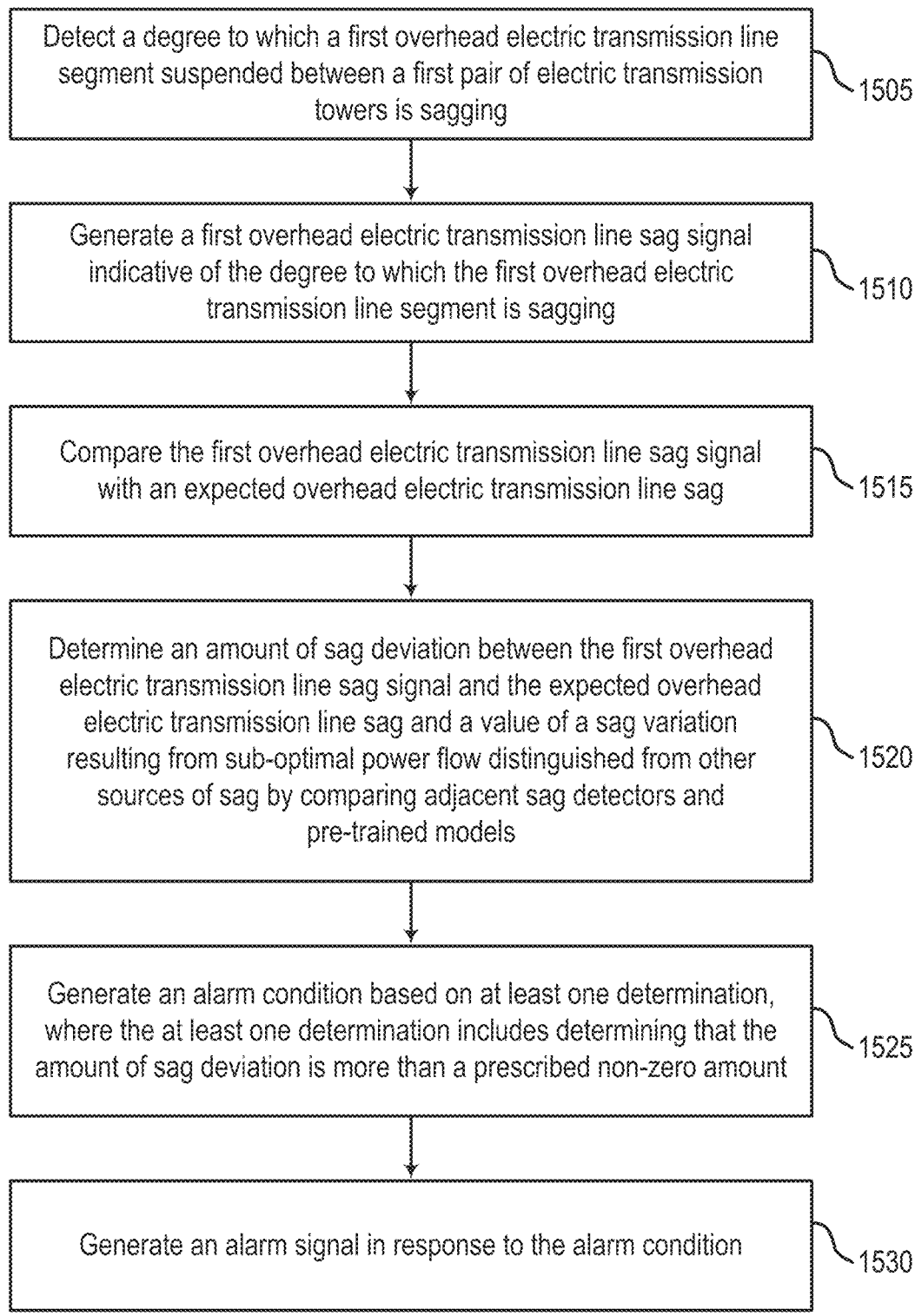
FIGS. 15 through 16 show examples of a method for wildfire detection using power infrastructure according to aspects of the present disclosure.

FIG. 15 shows an example of a method 1500 for wildfire detection using power infrastructure according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system detects a degree to which a first overhead electric transmission line segment suspended between a first pair of electric transmission towers is sagging. In some cases, the operations of this step refer to, or may be performed by, a first overhead electric transmission line sag sensor as described with reference to FIGS. 12 and 13.

At operation 1510, the system generates a first overhead electric transmission line sag signal indicative of the degree to which the first overhead electric transmission line segment is sagging. In some cases, the operations of this step refer to, or may be performed by, a first overhead electric transmission line sag sensor as described with reference to FIGS. 12 and 13.

At operation 1515, the system compares the first overhead electric transmission line sag signal with an expected overhead electric transmission line sag. In some cases, the operations of this step refer to, or may be performed by, a line sensor apparatus and/or a computing system as described with reference to FIGS. 12 and 13.

At operation 1520, the system determines an amount of sag deviation between the first overhead electric transmission line sag signal and the expected overhead electric transmission line sag and a value of a sag variation resulting from sub-optimal power flow distinguished from other sources of sag by comparing adjacent sag detectors and pre-trained models. In some cases, the operations of this step refer to, or may be performed by, a line sensor apparatus and/or a computing system as described with reference to FIGS. 12 and 13.

At operation 1525, the system generates an alarm condition based on at least one determination, where the at least one determination includes determining that the amount of sag deviation is more than a prescribed non-zero amount. In some cases, the operations of this step refer to, or may be performed by, a line sensor apparatus and/or a computing system as described with reference to FIGS. 12 and 13.

At operation 1530, the system generates an alarm signal in response to the alarm condition. In some cases, the operations of this step refer to, or may be performed by, an alarm output as described with reference to FIGS. 12 and 13.

Figure 16:
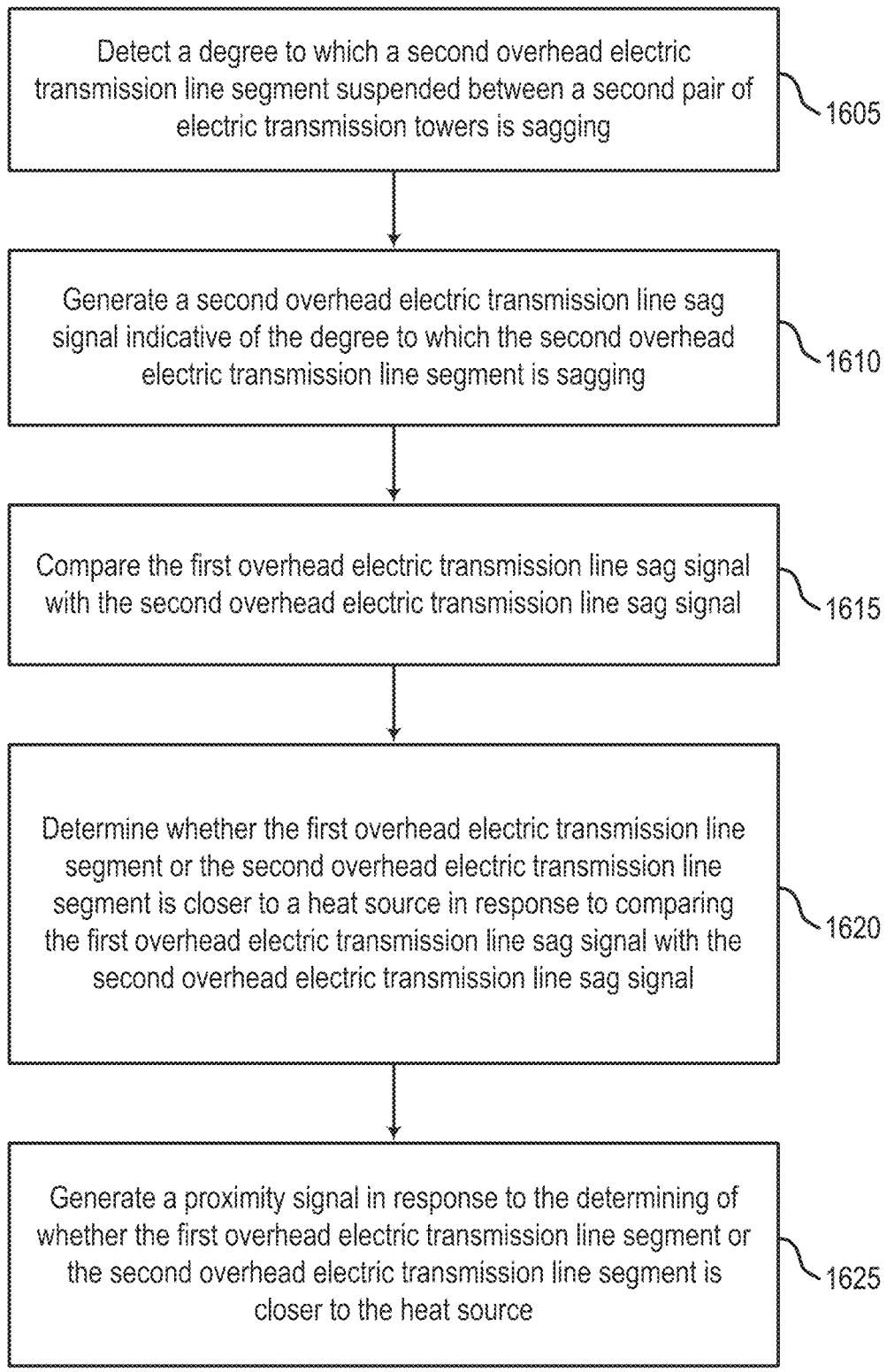

FIG. 16 shows an example of a method 1600 for wildfire detection using power infrastructure according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some examples, operations 1605 through 1625 may be performed prior to generating an alarm condition (e.g., prior to the operation 1530 described with reference to FIG. 15).

At operation 1605, the system detects a degree to which a second overhead electric transmission line segment suspended between a second pair of electric transmission towers is sagging. In some cases, the operations of this step refer to, or may be performed by, a second overhead electric transmission line sag sensor and/or a computing system as described with reference to FIGS. 12 and 13.

At operation 1610, the system generates a second overhead electric transmission line sag signal indicative of the degree to which the second overhead electric transmission line segment is sagging. In some cases, the operations of this step refer to, or may be performed by, a second overhead electric transmission line sag sensor and/or a computing system as described with reference to FIGS. 12 and 13.

At operation 1615, the system compares the first overhead electric transmission line sag signal with the second overhead electric transmission line sag signal. In some cases, the operations of this step refer to, or may be performed by, a line sensor apparatus and/or a computing system as described with reference to FIGS. 12 and 13.

At operation 1620, the system determines whether the first overhead electric transmission line segment or the second overhead electric transmission line segment is closer to a heat source in response to comparing the first overhead electric transmission line sag signal with the second overhead electric transmission line sag signal. In some cases, the operations of this step refer to, or may be performed by, a line sensor apparatus and/or a computing system as described with reference to FIGS. 12 and 13.

At operation 1625, the system generates a proximity signal in response to the determining of whether the first overhead electric transmission line segment or the second overhead electric transmission line segment is closer to the heat source. In some cases, the operations of this step refer to, or may be performed by, a proximity output as described with reference to FIG. 13.

Accordingly, the present disclosure includes the following aspects.

An apparatus for wildfire detection using power infrastructure is described. One or more aspects of the apparatus include a first overhead electric transmission line sag sensor, wherein the first overhead electric transmission line sag sensor detects a degree to which a first overhead electric transmission line segment suspended between a first pair of electric transmission towers is sagging and generates a first overhead electric transmission line sag signal indicative of the degree to which the first overhead electric transmission line segment is sagging; a computing system comprising a first code segment, a second code segment, and a third code segment: wherein the first code segment is configured to compare the first overhead electric transmission line sag signal with an expected overhead electric transmission line sag; the second code segment is configured to determine an amount of sag deviation between the first overhead electric transmission line sag signal and the expected overhead electric transmission line sag, and determine a value of a sag variation resulting from sub-optimal power flow distinguished from other sources of sag by comparing adjacent sag detectors and pre-trained models; and the third code segment is configured to generate an alarm condition based on at least one determination, wherein the at least one determination includes determining that the amount of sag deviation is more than a prescribed non-zero amount; and an alarm output coupled to the computing system configured to generate an alarm signal in response to the alarm condition.

Some examples of the apparatus, system, and method further include a second overhead electric transmission line sag sensor, wherein the second overhead electric transmission line sag sensor detects a degree to which a second overhead electric transmission line segment suspended between a second pair of electric transmission towers is sagging and generates a second overhead electric transmission line sag signal indicative of the degree to which the second overhead electric transmission line segment is sagging.

In some aspects, the computing system further comprises a fourth code segment and a fifth code segment: wherein the fourth code segment is configured to compare the first overhead electric transmission line sag signal with the second overhead electric transmission line sag signal; and the fifth code segment is configured to determine whether the first overhead electric transmission line segment or the second overhead electric transmission line segment is closer to a heat source in response to the fourth code segment comparing the first overhead electric transmission line sag signal with the second overhead electric transmission line sag signal.

Some examples of the apparatus, system, and method further include a proximity output coupled to the computing system and configured to generate a proximity signal in response to the determining of whether the first overhead electric transmission line segment or the second overhead electric transmission line segment is closer to the heat source.

Some examples of the apparatus, system, and method further include a temperature sensor, wherein the temperature sensor detects a temperature proximate to one of the first pair of electric transmission line towers and generates a temperature signal indicative of the temperature proximate to the one of the first pair of electric transmission line towers.

In some aspects, the computing system further comprises a fourth code segment and a fifth code segment: wherein the fourth code segment is configured to compare the temperature signal with an expected temperature; and the fifth code segment is configured to determine whether the temperature signal deviates from the expected temperature, wherein the generating of the alarm condition based on at least one determination further includes determining that the temperature signal deviates more than a prescribed non-zero amount from the expected temperature.

In some aspects, the third code segment further comprises ensemble learning utilizing both a degree to which the first overhead electric transmission line sag signal deviates from the expected overhead electric transmission line sag, and a degree to which the temperature signal deviates from the expected temperature.

Some examples of the apparatus, system, and method further include a wind speed sensor, wherein the wind speed sensor detects a wind speed proximate to one of the first pair of electric transmission line towers and generates a wind speed signal indicative of the wind speed proximate to the one of the first pair of electric transmission line towers.

In some aspects, the generating of the alarm condition based on at least one determination further includes determining that a derivative of the temperature signal with respect to the wind speed signal is positive.

In some aspects, the third code segment is further configured to determine a rate of change in the sag signal in a time domain and a space domain, and to compare a mathematical derivative of the rate of change in the sag signal to a prescribed mathematical model for normal weather and normal heating of the first overhead electric transmission line segment, wherein the generating of the alarm condition based on at least one determination further includes determining that the comparison indicates a deviation of the mathematical derivative of the rate of change in the sag signal a difference of more than a prescribed non-zero amount.

A method for wildfire detection using power infrastructure is described. One or more aspects of the method include detecting a degree to which a first overhead electric transmission line segment suspended between a first pair of electric transmission towers is sagging; generating a first overhead electric transmission line sag signal indicative of the degree to which the first overhead electric transmission line segment is sagging; comparing the first overhead electric transmission line sag signal with an expected overhead electric transmission line sag; determining an amount of sag deviation between the first overhead electric transmission line sag signal and the expected overhead electric transmission line sag and a value of a sag variation resulting from sub-optimal power flow distinguished from other sources of sag by comparing adjacent sag detectors and pre-trained models; generating an alarm condition based on at least one determination, wherein the at least one determination includes determining that the amount of sag deviation is more than a prescribed non-zero amount; and generating an alarm signal in response to the alarm condition.

Some examples of the method, apparatus, non-transitory computer readable medium, and system further include detecting, prior to generating the alarm condition, a degree to which a second overhead electric transmission line segment suspended between a second pair of electric transmission towers is sagging. Some examples further include generating a second overhead electric transmission line sag signal indicative of the degree to which the second overhead electric transmission line segment is sagging. Some examples further include comparing the first overhead electric transmission line sag signal with the second overhead electric transmission line sag signal. Some examples further include determining whether the first overhead electric transmission line segment or the second overhead electric transmission line segment is closer to a heat source in response to comparing the first overhead electric transmission line sag signal with the second overhead electric transmission line sag signal. Some examples further include generating, prior to generating the alarm condition, a proximity signal in response to the determining of whether the first overhead electric transmission line segment or the second overhead electric transmission line segment is closer to the heat source.

Some examples of the method, apparatus, non-transitory computer readable medium, and system further include detecting, prior to generating the alarm condition, a temperature proximate to one of the first pair of electric transmission line towers. Some examples further include generating a temperature signal indicative of the temperature proximate to the one of the first pair of electric transmission line towers. Some examples further include comparing, prior to generating the alarm condition, the temperature signal with an expected temperature.

In some aspects, the at least one determination further includes determining that the temperature signal deviates more than a prescribed non-zero amount from the expected temperature.

In some aspects, the generating of the alarm condition further comprises ensemble learning utilizing both a degree to which the first overhead electric transmission line sag signal deviates from the expected overhead electric transmission line sag, and a degree to which the temperature signal deviates from the expected temperature.

Some examples of the method, apparatus, non-transitory computer readable medium, and system further include detecting a wind speed proximate to one of the first pair of electric transmission line towers and generating a wind speed signal indicative of the wind speed proximate to the one of the first pair of electric transmission line towers, wherein the generating of the alarm condition further includes determining that a derivative of the temperature signal with respect to the wind speed signal is positive.

Some examples of the method, apparatus, non-transitory computer readable medium, and system further include determining a rate of change in the sag signal in a time domain and a space domain. Some examples further include comparing a mathematical derivative of the rate of change in the sag signal to a prescribed mathematical model for normal weather and normal heating of the first overhead electric transmission line segment, wherein the generating of the alarm condition further includes determining that the comparison indicates a deviation of the mathematical derivative of the rate of change in the sag signal a difference of more than a prescribed non-zero amount.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for detecting radiated heat events proximate to a power line comprising:
 a first overhead electric transmission line sag sensor, wherein the first overhead electric transmission line sag sensor detects a degree to which a first overhead electric transmission line segment suspended between a first pair of electric transmission towers is sagging and generates a first overhead electric transmission line sag signal indicative of the degree to which the first overhead electric transmission line segment is sagging;
 a computing system comprising:
  first code segment configured to compare the first overhead electric transmission line sag signal with an expected overhead electric transmission line sag;
  a second code segment configured to determine an amount of sag deviation between the first overhead electric transmission line sag signal and the expected overhead electric transmission line sag, and determine a value of a sag variation resulting from sub-optimal power flow distinguished from other sources of sag by comparing adjacent sag detectors and pre-trained models;
  a third code segment configured to generate an alarm condition based on at least one determination, wherein the at least one determination includes determining that the amount of sag deviation is more than a prescribed non-zero amount; and
 an alarm output coupled to the computing system configured to generate an alarm signal in response to the alarm condition.

2. The system for detecting radiated heat events proximate to the power line of claim 1, further comprising:
 a second overhead electric transmission line sag sensor, wherein the second overhead electric transmission line sag sensor detects a degree to which a second overhead electric transmission line segment suspended between a second pair of electric transmission towers is sagging and generates a second overhead electric transmission line sag signal indicative of the degree to which the second overhead electric transmission line segment is sagging;
 said computing system further comprising:
  a fourth code segment configured to compare the first overhead electric transmission line sag signal with the second overhead electric transmission line sag signal;
  a fifth code segment configured to determine whether the first overhead electric transmission line segment or the second overhead electric transmission line segment is closer to a radiated heat source in response to the fourth code segment comparing the first overhead electric transmission line sag signal with the second overhead electric transmission line sag signal; and a proximity output coupled to the computing system and configured to generate a proximity signal in response to the determining of whether the first overhead electric transmission line segment or the second overhead electric transmission line segment is closer to the radiated heat source.

3. The system for detecting radiated heat events proximate to the power line of claim 1, further comprising:

a temperature sensor, wherein the temperature sensor detects a temperature proximate to one of the first pair of electric transmission line towers and generates a temperature signal indicative of the temperature proximate to the one of the first pair of electric transmission line towers;

said computing system further comprising:
a fourth code segment configured to compare the temperature signal with an expected temperature;
a fifth code segment configured to determine whether the temperature signal deviates from the expected temperature, wherein the generating of the alarm condition based on at least one determination further includes determining that said temperature signal deviates more than a prescribed non-zero amount from the expected temperature.

4. The system for detecting radiated heat events proximate to the power line of claim 3, further comprising:

said third code segment further comprising ensemble learning utilizing both a degree to which the first overhead electric transmission line sag signal deviates from the expected overhead electric transmission line sag, and a degree to which said temperature signal deviates from the expected temperature.

5. The system for detecting radiated heat events proximate to the power line of claim 3, further comprising:

a wind speed sensor, wherein the wind speed sensor detects a wind speed proximate to one of the first pair of electric transmission line towers and generates a wind speed signal indicative of the wind speed proximate to the one of the first pair of electric transmission line towers;

wherein the generating of the alarm condition based on at least one determination further includes determining that a derivative of said temperature signal with respect to said wind speed signal is positive.

6. The system for detecting radiated heat events proximate to the power line of claim 3, further comprising:

wherein said third code segment is further configured to determine a rate of change in said sag signal in a time domain and a space domain, and to compare a mathematical derivative of said rate of change in said sag signal to a prescribed mathematical model for normal weather and normal heating of said first overhead electric transmission line segment, wherein the generating of the alarm condition based on at least one determination further includes determining that said comparison indicates a deviation of said mathematical derivative of said rate of change in said sag signal a difference of more than a prescribed non-zero amount.

7. A method for detecting radiated heat events proximate to a power line comprising:

detecting by a first overhead electric transmission line sag sensor of a degree to which a first overhead electric transmission line segment suspended between a first pair of electric transmission towers is sagging;

generating by the first overhead electric transmission line sag sensor of a first overhead electric transmission line sag signal indicative of the degree to which the first overhead electric transmission line segment is sagging;

comparing, by a computing system, of the first overhead electric transmission line sag signal with an expected overhead electric transmission line sag;

determining, by the computing system, an amount of sag deviation between the first overhead electric transmission line sag signal and the expected overhead electric transmission line sag and a value of a sag variation resulting from sub-optimal power flow distinguished from other sources of sag by comparing adjacent sag detectors and pre-trained models;

generating, by the computing system, of an alarm condition based on at least one determination, wherein the at least one determination includes determining that the amount of sag deviation is more than a prescribed non-zero amount; and in response to the generating of the alarm condition, generating an alarm signal by an alarm output coupled to the computing system in response to the alarm condition.

8. The method for detecting radiated heat events proximate to the power line of claim 7, further comprising, prior to generating the alarm condition:

detecting by a second overhead electric transmission line sag sensor of a degree to which a second overhead electric transmission line segment suspended between a second pair of electric transmission towers is sagging;

generating by the second overhead electric transmission line sag sensor of a second overhead electric transmission line sag signal indicative of the degree to which the second overhead electric transmission line segment is sagging;

comparing, by the computing system, of the first overhead electric transmission line sag signal with the second overhead electric transmission line sag signal; and determining, by the computing system, whether the first overhead electric transmission line segment or the second overhead electric transmission line segment is closer to a radiated heat source in response to comparing the first overhead electric transmission line sag signal with the second overhead electric transmission line sag signal; and generating a proximity signal by a proximity output coupled to the computing system in response to the determining of whether the first overhead electric transmission line segment or the second overhead electric transmission line segment is closer to the radiated heat source.

9. The method for detecting radiated heat events proximate to the power line of claim 7, further comprising, prior to generating the alarm condition:

detecting by a temperature sensor of a temperature proximate to one of the first pair of electric transmission line towers;

generating by the temperature sensor of a temperature signal indicative of the temperature proximate to the one of the first pair of electric transmission line towers; and comparing, by a computing system, of the temperature signal with an expected temperature.

10. The method for detecting radiated heat events proximate to the power line of claim 9, wherein:

the generating of the alarm condition further comprises the at least one determination further including determining that said temperature signal deviates more than a prescribed non-zero amount from the expected temperature.

11. The method for detecting radiated heat events proximate to the power line of claim 9, wherein:
the generating of the alarm condition further comprises ensemble learning utilizing both a degree to which the first overhead electric transmission line sag signal deviates from the expected overhead electric transmission line sag, and a degree to which said temperature signal deviates from the expected temperature.

12. The method for detecting radiated heat events proximate to the power line of claim 9, further comprising:
detecting, by a wind speed sensor, a wind speed proximate to one of the first pair of electric transmission line towers and generating a wind speed signal indicative of the wind speed proximate to the one of the first pair of electric transmission line towers, wherein the generating of the alarm condition further includes determining that a derivative of said temperature signal with respect to said wind speed signal is positive.

13. The method for detecting radiated heat events proximate to the power line of claim 9, further comprising:
determining a rate of change in said sag signal in a time domain and a space domain;
comparing a mathematical derivative of said rate of change in said sag signal to a prescribed mathematical model for normal weather and normal heating of said first overhead electric transmission line segment, wherein the generating of the alarm condition further includes determining that said comparison indicates a deviation of said mathematical derivative of said rate of change in said sag signal a difference of more than a prescribed non-zero amount.

\* \* \* \* \*